(12) United States Patent
Subramanian et al.

(10) Patent No.: US 7,920,599 B1
(45) Date of Patent: Apr. 5, 2011

(54) METHODS AND SYSTEMS FOR SYNCHRONIZING WIRELESS TRANSMISSION OF DATA PACKETS

(75) Inventors: Srikanth Subramanian, Chennai (IN); Sathish Viswanathan, Tamil Nadu (IN)

(73) Assignees: Anna University (IN); KBC Research Foundation (IN)

( * ) Notice: Subject to any disclaimer, the term of this patent is extended or adjusted under 35 U.S.C. 154(b) by 0 days.

(21) Appl. No.: 12/726,960

(22) Filed: Mar. 18, 2010

(30) Foreign Application Priority Data

Feb. 3, 2010 (IN) .............................. 269/CHE/2010

(51) Int. Cl.
*H04B 3/20* (2006.01)
(52) U.S. Cl. ....................................... 370/509; 370/292
(58) Field of Classification Search .................. 370/292, 370/509–513; 375/354, 355, 362
See application file for complete search history.

(56) References Cited

U.S. PATENT DOCUMENTS

| 7,646,703 | B2 * | 1/2010 | Trachewsky et al. | 370/208 |
| 2006/0252386 | A1 * | 11/2006 | Boer et al. | 455/101 |
| 2007/0211785 | A1 | 9/2007 | Nakache et al. | |

FOREIGN PATENT DOCUMENTS

| WO | WO 2007/027870 | 3/2007 |
| WO | WO 2007/148187 | 12/2007 |

OTHER PUBLICATIONS

International Search Report and Written Opinion issued by the Australian Patent Office in PCT/IB2010/054140, dated Jan. 4, 2011.
Stuber, et al., "Broadband MIMO-OFDM Wireless Communications", Proceedings of the IEEE, vol. 92, No. 2, Feb. 2004, pp. 271-294.
IEEE 802.11a standard, ISO/IEC 8802-11:1999/Amd 1:2000(E), http://standards.ieee.org/getieee802/download/802.11a-1999.pdf.
IEEE 802.11g standard, Further Higher-Speed Physical Layer Extension inthe2.4GHzBand, http://standards.ieee.org/getieee802/download /802. 11g-2003.pdf.
T. M. Schmidl and D.C. Cox, "Robust Frequency and Timing Synchronization for OFDM", IEEE Trans. on Communications, vol. 45, No. 12, pp. 1613-1621, Dec. 1997.

(Continued)

*Primary Examiner* — Huy D Vu
*Assistant Examiner* — Benjamin Lamont
(74) *Attorney, Agent, or Firm* — McDonnell Boehnen Hulbert & Berghoff LLP

(57) ABSTRACT

Methods and systems for synchronizing wireless transmission of data packets is provided. Signals having a data packet frame format including a preamble (with a pattern of symbol sequences) and data are received, and patterns of symbol sequences are correlated. A first metric can be calculated that is a ratio of an average of the correlation values and an average of a power of the signals. A second metric can be calculated that defines an average of a power of noise in the signals. The methods include determining an approximate division of the preamble and data in the data packet of each signal based on the first and second metrics. The methods further include determining a cross-correlation between versions of a transmitted signal to produce a number of peaks equal to a number of transmit antennas, generating a third metric based on combinations of cross-correlations, and identifying a position of a maximum peak within the third metric as a fine timing offset amount.

20 Claims, 14 Drawing Sheets

OTHER PUBLICATIONS

A. N. Mody and G.L. Stuber, "Synchronization for MIMO-OFDM systems," in Proc. IEEE Global Commun. Conf., vol. 1, pp. 509-513, Nov. 2001.

A. Van Zelst and Tim C. W. Schenk, "Implementation of MIMO-OFMD based Wireless LAN systems", IEEE Trans. On Signal Proc. vol. 52, No. 2, pp. 483-494, Feb. 2004.

Jianhua Liu and Jian Li, "A MIMO system with backward compatibility for OFDM based WLANs", EURASIP journal on Applied signal processing. pp. 696-706, May 2004.

IEEE P802.11 TGn channel models, May 10, 2004,http://www.ece.ariz ona.edu/~yanli/files/11-03-0940-04-000n-tgn-channel-models.doc.

IEEE P802.11n™/D2.00, "Draft standard for Information Technology-Telecommunications and information exchange between systems-Local and metropolitan area networks-Specific requirements-", Feb. 2007.

* cited by examiner

METHODS AND SYSTEMS FOR SYNCHRONIZING WIRELESS TRANSMISSION OF DATA PACKETS

CROSS REFERENCE TO RELATED APPLICATION

The present application claims priority under 35 U.S.C. §119 to a corresponding patent application filed in India and having application number 269/CHE/2010, filed on Feb. 3, 2010, the entire contents of which are herein incorporated by reference.

BACKGROUND

In a wireless communication system, a data packet format usually includes control information and user data. The control information includes data such as source and destination addresses, error detection codes like checksums, and sequencing information. Control information may be found in packet headers and trailers, and user data is included in between. The control information further includes a fixed-pattern preamble. The preamble serves several purposes, namely, to identify a packet type, and to provide a signal for Direct Current (DC) offset estimation, frequency offset estimation and channel estimation, for example.

In addition, another example purpose of the preamble is to allow time for a receiver to achieve lock of a receiver digital phase lock loop that is used to synchronise a receive data clock to a transmit data clock. At a point when a first bit of the preamble is received, a receiver may be in an arbitrary state (i.e., have an arbitrary phase for a local clock of the receiver). During the course of the preamble, the receiver learns a correct phase, but in so doing, the receiver may miss (or gain) a number of bits. A preamble thus usually includes a predetermined pattern to mark the last two bits of the preamble. When the pattern is received, the receiver begins collecting bits into bytes for data processing. The receiver may also confirm a polarity of a transition representing a logic high data bit to the receiver (as a check in case the bit has been inverted), for example.

Different communications protocols use different conventions for distinguishing between control information and user data. In Binary Synchronous Transmission, for example, the data packet is formatted in 8-bit bytes, and special characters are used to delimit different elements. Other protocols, like Ethernet, establish a beginning of a header and data elements by a location relative to the start of the data packet. Some other protocols format information at a bit level instead of a byte level.

Many over-the-air modulation techniques use similar basic protocols, and each technique usually includes use of preambles for use in transmission of data as well as management and control of wireless links. Transmitters and receivers may be programmed and designed to receive wireless signals, and to decode the signals based on expected preamble content. However, as new technology is developed, new modulation techniques may not be compatible with previous transmitter and receiver designs. Thus, for new and legacy systems to co-exist, new modulation techniques may need to have the ability to generate legacy data packets for the legacy systems and high throughput packets for new systems. To do so, modified preambles may be employed to enable both legacy equipment and new equipment to detect information in a received data packet.

SUMMARY

In an example aspect, a method for synchronizing wireless transmission of data packets is provided. The method includes receiving a plurality of signals, and each signal has a data packet frame format including a preamble and data. The preamble comprises a pattern of symbol sequences repeated a number of times. The method also includes correlating patterns of symbol sequences within the plurality of signals to produce correlation values. The method also includes calculating a first metric of the plurality of signals. The first metric is a ratio of an average of the correlation values of the plurality of signals and an average of a power of the plurality of signals. The method also includes calculating a second metric that defines an average of a power of noise in the plurality of signals. The method further includes determining an approximate division of the preamble and the data in the data packet frame format of each signal based on values of the first metric and the second metric.

In another example aspect, a computer readable medium having stored therein instructions executable by a computing device to cause the computing device to perform functions is provided. The functions include receiving a plurality of signals and each signal has a data packet frame format including a preamble and data. The preamble comprises a pattern of symbol sequences repeated a number of times. The functions further include correlating patterns of symbol sequences within the plurality of signals to produce correlation values. The functions also include calculating a first metric of the plurality of signals that is a ratio of an average of the correlation values of the plurality of signals and an average of a power of the plurality of signals. The functions also include calculating a second metric that defines an average of a power of noise in the plurality of signals, and determining an approximate division of the preamble and the data in the data packet frame format of each signal based on values of the first metric and the second metric.

In another example aspect, a system is provided that comprises a processor, a data storage medium, and machine language instructions stored on the data storage medium and executable by the processor to perform functions including receiving a plurality of signals and each signal has a data packet frame format including a preamble and data. The preamble comprises a pattern of symbol sequences repeated a number of times. The functions also include correlating patterns of symbol sequences within the plurality of signals to produce correlation values, and calculating a first metric of the plurality of signals that is a ratio of an average of the correlation values of the plurality of signals and an average of a power of the plurality of signals. The functions also include calculating a second metric that defines an average of a power of noise in the plurality of signals, and determining an approximate division of the preamble and the data in the data packet frame format of each signal based on values of the first metric and the second metric.

In another example aspect, each signal of a plurality of signals includes multiple versions of a transmitted signal, and each version is a cyclically shifted version of the transmitted signal. The example methods and example systems may thus further include functions of receiving the plurality of signals at a plurality of receive antennas, and at each receive antenna, determining a cross correlation between the multiple versions of the transmitted signal to produce a number of peaks equal to a number of transmit antennas where each peak corresponds to a position to where the transmitted signal was shifted. The functions further include at each receive antenna, combining cross correlations of the multiple versions of the transmitted signal by shifting correlated outputs so that peaks substantially match to produce combined cross-correlations, adding combined cross-correlations from each antenna to produce a third metric, and identifying a position of a maximum peak within the third metric as a fine timing offset amount that defines the approximate division of the preamble and the data in the data packet frame format of each signal. In one example, the approximate division may be an optimal division of the preamble and the data in the data packet.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
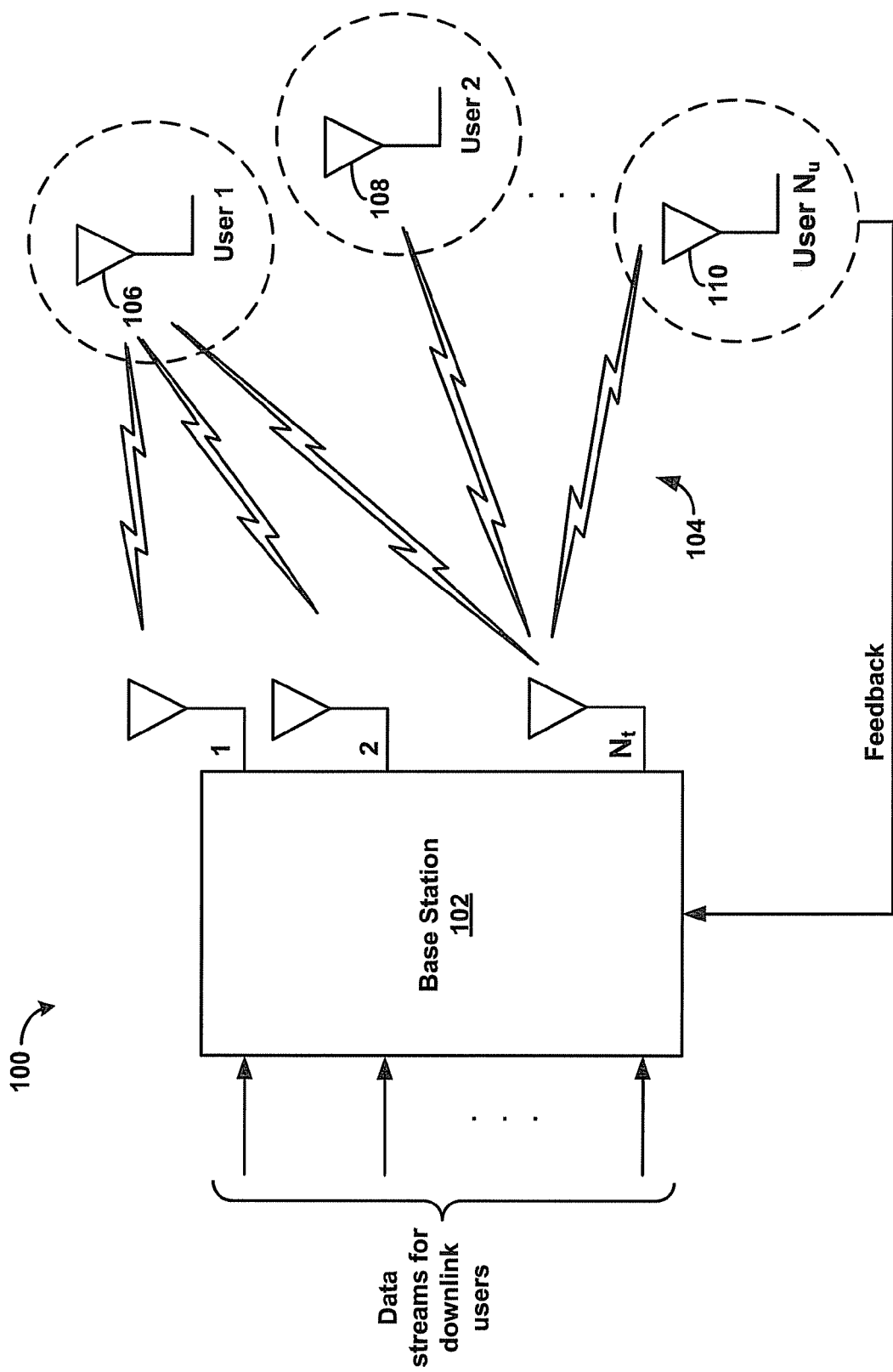
FIG. 1 is a block diagram of an example multiuser MISO system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

In example embodiments below, methods are described for synchronizing wireless transmission of data packets. The institution of electrical and electronics engineers (IEEE) 802.11 family of specifications describes over-the-air modulation techniques that use the same basic protocol, and each technique includes use of preambles for use in transmission of data as well as management and control of wireless links. In IEEE 802.11n wireless local area network (WLAN) systems, which employ multiple input multiple output orthogonal frequency division multiplexing (MIMO-OFDM), there are two modes of transmission that are used (e.g., a mixed mode transmission and a green field mode of transmission) and each mode employs a different preamble, for example. Methods and systems described herein define techniques to detect preambles and data within a data packet.

Example methods described herein include receiving a plurality of signals, and each signal has a data packet frame format including a preamble and data. The preamble comprises a pattern of symbol sequences repeated a number of times. The methods further include correlating patterns of symbol sequences within the plurality of signals to produce correlation values. A first metric of the plurality of signals can be calculated that is a ratio of an average of the correlation values of the plurality of signals and an average of a power of the plurality of signals. In addition, a second metric can be calculated that defines an average of a power of noise in the plurality of signals. The methods further include determining an approximate division of the preamble and the data in the data packet frame format of each signal based on values of the first metric and the second metric. The methods may further include determining a cross-correlation between versions of a transmitted signal to produce a number of peaks equal to a number of transmit antennas, generating a third metric based on combinations of cross-correlations, and identifying a position of a maximum peak within the third metric as a fine timing offset amount.

Example embodiments described below may be arranged, substituted, combined, and designed in a wide variety of different configurations, all of which are explicitly contemplated and are made part of this disclosure.

In wireless communications, a single antenna may be used at a source to wirelessly transmit a signal to a single antenna at a destination. In some cases, this may give rise to problems due to multipath effects. For example, when a wireless signal (an electromagnetic field) is met with obstructions such as hills, canyons, buildings, and utility wires, wavefronts are scattered, and thus may take many paths to reach the destination. Late arrival of scattered portions of the signal causes problems such as fading, cut-out, and intermittent reception.

Multiple input multiple output (MIMO) systems can be used in which multiple antennas are used at both the source (transmitter) and the destination (receiver). The antennas at each end of the communication are combined to minimize errors and optimize data speed. MIMO is one of several forms of smart antenna technology. Other forms include multiple input, single output (MISO) and single input, multiple output (SIMO). Using smart antenna technology (e.g., multiple antennas at both the source and the destination) can eliminate the signal problems caused by multipath wave propagation, and can even take advantage of this effect.

FIG. 1 is a block diagram of an example multiuser MISO system 100 including a base station (BS) 102 communicating with $N_u$ users on a downlink communication channel 104. The BS 102 includes transmit antennas 1, 2, . . . , $N_t$, and each downlink user is equipped with one receive antenna, such as antennas 106, 108 and 110.

As one example of a MIMO system, the IEEE 802.11n standard, which employs multiple input multiple output orthogonal frequency division multiplexing (MIMO-OFDM), uses different operating modes configured based on a type of device in the network. The different operating modes include non-high throughput (non-HT) mode, high throughput (HT) mixed mode, and HT green field mode.

For example, in the mixed mode of transmission, both 802.11n MIMO-OFDM systems and legacy 802.11 systems co-exist, and the 802.11n MIMO system has the capability to generate legacy data packets for the legacy systems and high throughput packets for MIMO-OFDM systems. Thus, in the mixed mode of transmission, a long header preamble is employed to enable both legacy equipment and 802.11n equipment to detect information in the header. In the green field mode of transmission, only 802.11n MIMO-OFDM systems are used. The green field mode is intended for high throughput transmission only. No transmissions are intended to legacy equipment or mixed mode systems from the green field system. In the green field mode of transmission, a shortened header can thus be used and is only applicable to a selected set of equipment for synchronization purposes. Data packets transmitted in the green field mode will have only MIMO specific preambles, and thus, no legacy format preambles are present. Because of the different types of preambles used in 802.11n networks for the different modes of transmission, different methods are used for synchronization purposes in the 802.11n networks that support both preambles. The MIMO-OFDM receivers should be able to decode the green field mode packets as well as legacy format packets.

Figure 2:
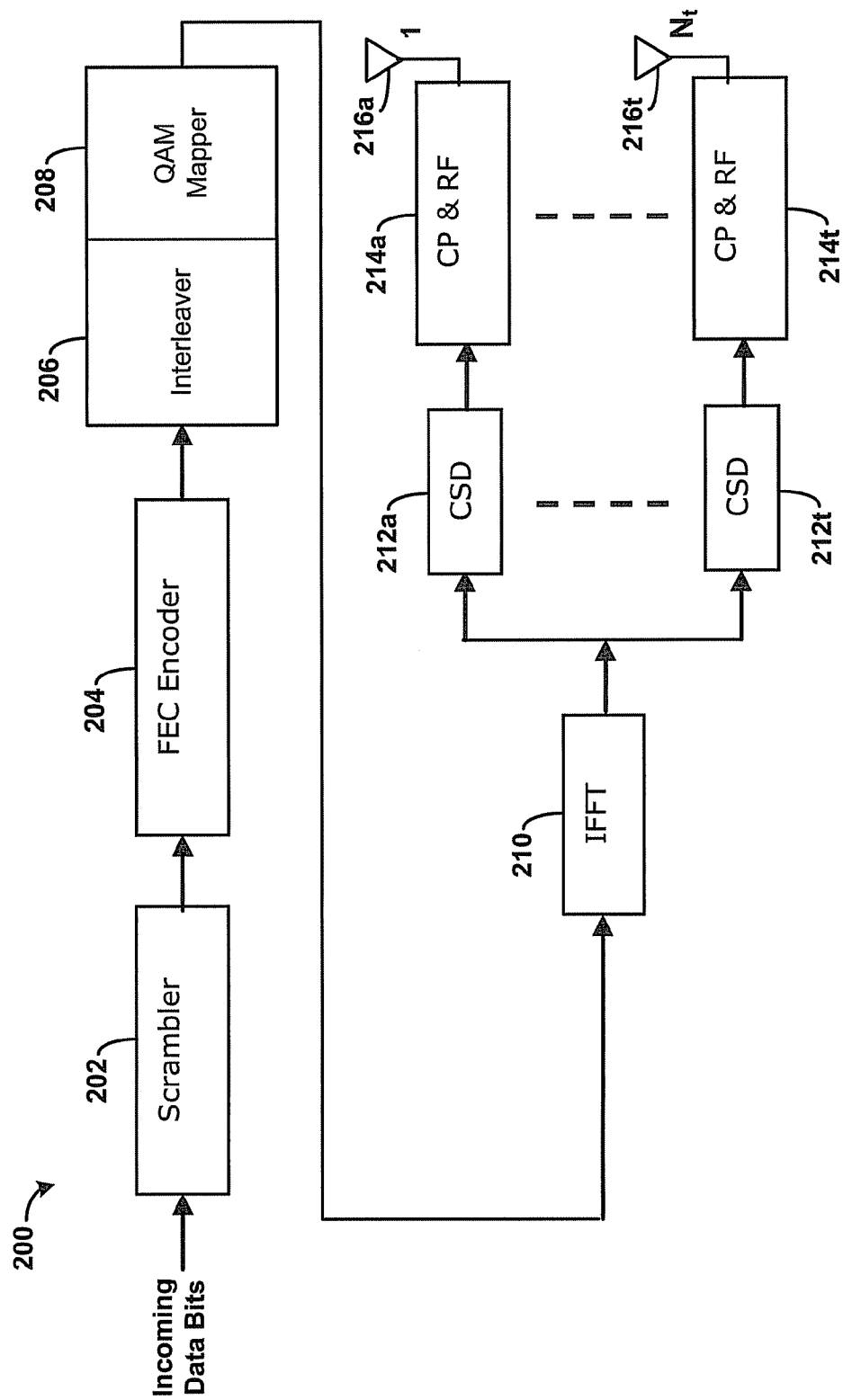
FIG. 2 is a block diagram of an example MIMO-OFDM transmitter.

An example MIMO-OFDM transmitter 200 used in the HT mixed mode of the 802.11n standard is shown in FIG. 2. The transmitter 200 may be a base station, such as shown in FIG. 1, and each block may represent a module, a segment, or a portion of program code, which includes one or more instructions executable by a processor for implementing specific logical functions or steps in the process. In addition, each block may represent circuitry that is wired to perform the specific logical functions.

Incoming data bits to be transmitted by the transmitter 200 are randomized with a unique scramble code using a scrambler 202 to avoid occurrence of long zeros and ones. The unique scramble code is provided to a receiver, so that the receiver may multiply a received signal by the same scramble code that the transmitter used in order to descramble bits of the signal, for example.

A forward error correction encoder (FEC) block 204 encodes the scrambled data to enable channel error correction capabilities. The FEC block 204 includes a binary convolutional encoder followed by a puncturing block, for example. A basic coding rate of ½ is achieved using the FEC block 204 and other coding rates, such as ¾, ⅔, and ⅚ are achieved with the help of a puncturing pattern defined in the 802.11n standard.

All encoded data bits are interleaved by a block interleaver 206 with a block size corresponding to a number of bits in a single OFDM symbol, $N_{CBPS}$ (number of coded bits per symbol). The interleaver 206 is defined by a two-step permutation. A first permutation ensures that adjacent coded bits are mapped onto nonadjacent subcarriers. A second permutation ensures that adjacent coded bits are mapped alternately onto less and more significant bits of the constellation, and thereby, long runs of low reliability least significant bits (LSB) are avoided. Then, the interleaved bits are mapped to complex symbols using a quadrature amplification modulation (QAM) constellation mapper 208. Out of 64 subcarriers in 20 MHz operation, for example, data symbols are mapped onto subcarriers −26 to −1 and +1 to 26. Remaining subcarriers are loaded with guard subcarriers and pilot symbols, for example.

Then an N-point inverse fast Fourier transform (IFFT) using an IFFT block 210 is taken and distributed across $N_t$ transmit (TX) antennas in a circular manner. In each transmit antenna, a cyclic shift delay (CSD) element 212a-212t is introduced across the signals. This helps avoid a beamforming effect at a receiver during preamble transmission. A cyclic prefix of length $N_{cp}$ is appended in front of a cyclically shifted IFFT output to combat intersymbol interference caused due to a multipath channel. It is assumed that a total TX power is divided equally among the $N_t$ transmit antennas. The signal is then upconverted to radio frequency using a cyclic prefix (CP) and radio frequency (RF) block 214a-214t and transmitted through the spatially correlated quasi-static multipath channel using an antenna 216a-216t. Thus, the antennas 216a-216t each transmit the same data packet although shifted in time by the CSD elements 212a-212t.

In the non-HT operating mode of 802.11n, a format of a transmitter will be similar to the transmitter 200 shown in FIG. 2, except that the transmitter will include a single transmit antenna chain. A cyclical delay shift (CDS) applied to a transmit chain in a non-HT transmitter is 0 μs, for example, since there is only a single transmit antenna chain.

In an HT green field operating mode of 802.11n, a format of a transmitter is different from the mixed mode transmitter 200 and is defined in such a way that improved performance is achieved in MIMO only configurations. For example, incoming data bits are scrambled bits and then parsed into 1 or 2 sequences for encoding. The encoded sequences are passed into a single stream parser where the data is parsed into $N_t$ data streams, and in each stream interleaving, constellation mapping, and CSD are applied separately. All the data streams are then passed through a spatial mapper where mapping of data symbols into data subcarriers of $N_t$ inverse discrete Fourier transform (IDFT) blocks is performed. After the IDFT operation and CP appending, the signal is upconverted and transmitted in the RF.

The CSD introduced into the data packet for each transmit chain of the non-HT and HT portion of the preamble is given in Tables 1 and 2 below in terms of samples and time in nanoseconds (ns). For example, a transmitter may have multiple antennas, and each antenna may transmit the same data packet although shifted in time by the cyclic shift shown below. A receiver will receive all signals, and starting positions of the signals will be different due to the cyclic shift, for example.

TABLE 1

| Cyclic shift for the non-HT portion of the packet | | | | |
| --- | --- | --- | --- | --- |
| Number of Transmit Chain | Cyclic shift for TX chain 1 (ns) | Cyclic shift for TX chain 2 (ns) | Cyclic shift for TX chain 3 (ns) | Cyclic shift for TX chain 4 (ns) |
| 1 | 0 | | | |
| 2 | 0 | −200 | | |
| 3 | 0 | −100 | −200 | |
| 4 | 0 | −50 | −100 | −150 |

Example cyclic shifts for non-HT portions of data packets are shown in Table 1. For example, as shown in Table 1, a cyclic shift for a transmit antenna chain with only one antenna is zero because there can be no shifted signal sent by a second antenna. For a transmit chain of two antennas, a second antenna shifts the signal by 200 ns (e.g., delays transmitting the signal for 200 ns after transmission of the signal by the first antenna). For a transmit antenna chain of three antennas, the second antenna delays transmission of the signal by 100 ns after transmission by the first antenna, and the third antenna delays transmission by 200 ns after transmission by the second antenna, for example. For a transmit antenna chain of four antennas, the second antenna delays transmission the signal by 50 ns after transmission by the first antenna, the third antenna delays transmission by 100 ns after transmission by the second antenna, and the fourth antenna delays transmission by 150 ns after transmission by the third antenna, for example.

TABLE 2

Cyclic shift for the HT portion of the packet

| Number of Transmit Chain | Cyclic shift for TX chain 1 (ns) | Cyclic shift for TX chain 2 (ns) | Cyclic shift for TX chain 3 (ns) | Cyclic shift for TX chain 4 (ns) |
|---|---|---|---|---|
| 1 | 0 | | | |
| 2 | 0 | −400 | | |
| 3 | 0 | −400 | −200 | |
| 4 | 0 | −400 | −200 | −600 |

Example cyclic shifts for HT portions of data packets are shown in Table 2. For example, as shown in Table 2, a cyclic shift for a transmit antenna chain with only one antenna is zero because there can be no shifted signal sent by a second antenna. For a transmit chain of two antennas, a second antenna shifts the signal by 400 ns (e.g., delays transmitting the signal for 400 ns after transmission of the signal by the first antenna). For a transmit antenna chain of three antennas, the second antenna delays transmission of the signal by 400 ns after transmission by the first antenna, and the third antenna delays transmission by 200 ns after transmission by the second antenna, for example. For a transmit antenna chain of four antennas, the second antenna delays transmission the signal by 400 ns after transmission by the first antenna, the third antenna delays transmission by 200 ns after transmission by the second antenna, and the fourth antenna delays transmission by 600 ns after transmission by the third antenna, for example.

Table 3 below provides cyclic shift duration values depicted according to a corresponding cyclic shift in samples. The negative values in the tables indicate a shift to the left, for example.

TABLE 3

| Cyclic shift duration in nanoseconds | Cyclic shift in number of samples (−k) |
|---|---|
| 0 | 0 |
| −50 | −1 |
| −100 | −2 |
| −150 | −3 |
| −200 | −4 |

Figure 3:
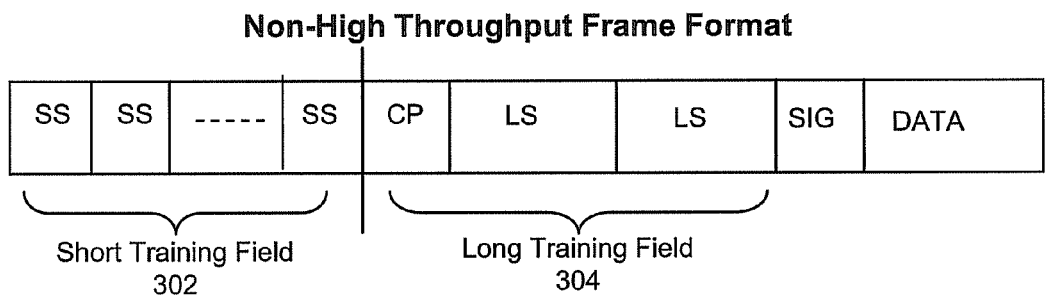
FIG. 3 illustrates an example frame format of a data packet for a non-HT frame format.
Figure 4:
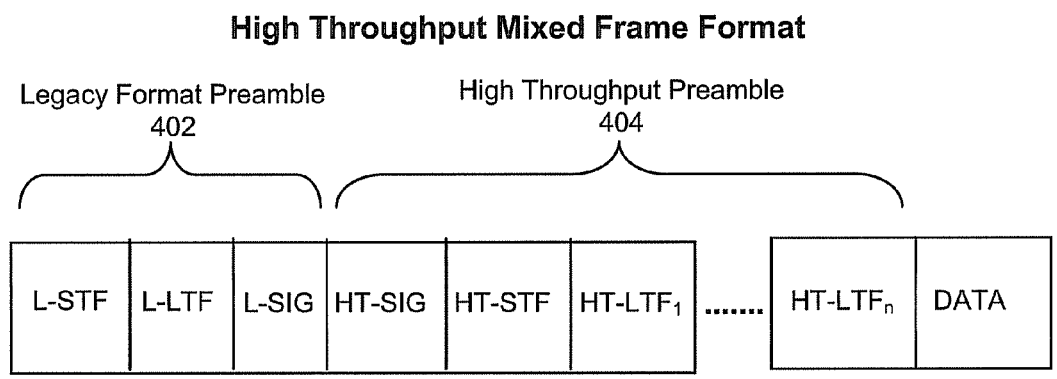
FIG. 4 illustrates an example frame format of a data packet for a HT mixed frame format.
Figure 5:
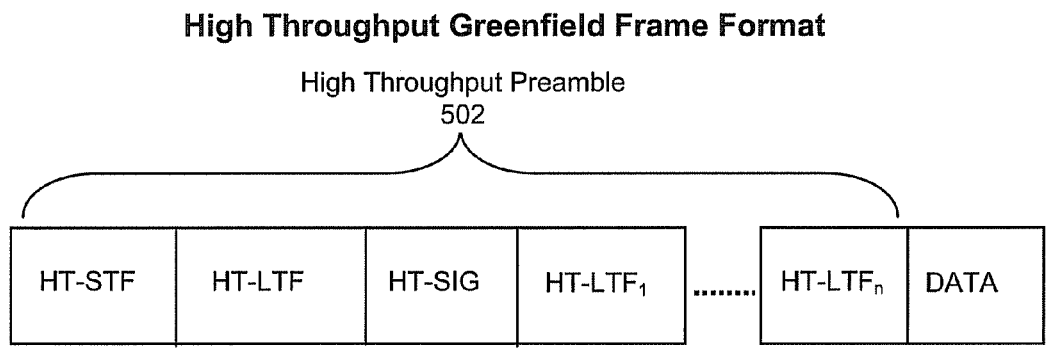
FIG. 5 illustrates an example frame format of a data packet for a HT only frame format.

Different operating modes of wireless protocols may have specific frame formats, and for backward compatibility reasons, new technology formats (such as the HT MIMO-OFDM data format of IEEE 802.11n) may use specific fields of non-HT preambles, for example. FIGS. 3-5 illustrate example frame formats of data packets for different operating modes of an example system.

FIG. 3 illustrates an example frame format of a data packet for a non-HT frame format. The frame format of the data packet shown in FIG. 3 may be used in legacy networks where only 802.11a/g enabled devices are present, for example. The data packet includes a number of short symbols (SS) each of a specific duration, and the short symbols are referred to as the short training field (STF) 302. For example, the data packet may include 10 identical short symbols each of a duration of about 0.8 μs in the STF 302. Initial receiver tasks, such as packet arrival detection, automatic gain control (AGC), coarse time acquisition, and coarse frequency acquisition may be performed using a correlation property of the STF, for example.

The data packet also includes an extended cyclic prefix (CP), which is followed by long symbols (LS). The CP and the long symbols are referred to as a long training field (LTF) 304. The CP may be of a duration of about 1.6 μS, and the LTF 304 may include two identical long symbols (LS) each of a duration of about 3.2 for example. The LTF is used for channel estimation, fine timing, and fine frequency acquisition, for example.

Following the LTF 304, a signal field (SIG) carries rate and length information of the data packet. The SIG field may be of a duration of about 4 μs, for example. After the SIG field, data begins.

FIG. 4 illustrates an example frame format of a data packet for a HT mixed frame format. The frame format of the data packet shown in FIG. 4 may be used in a mixed mode network where HT mobile stations and legacy mobile stations co-exist, for example. For example, in a network including multiple antenna enabled systems, the antennas may be capable of transmitting and receiving legacy frames and MIMO-OFDM frames, for example.

To provide backward compatibility for legacy systems, the data packet in FIG. 4 includes all three fields of the non-HT preamble as shown in FIG. 3 including an STF, an LTF, and an SIG field. For example, the data packet in FIG. 4 includes a legacy format preamble 402 including the STF in the form of legacy short training fields (L-STF), the LTF in the form of legacy long training fields (L-LTF), and the SIG field in the form of a legacy signal field (L-SIG). Providing the legacy format preamble 402 enables legacy mobile stations to decode the SIG field of an HT frame format, and allows MIMO-OFDM transmissions to progress without collisions, for example.

The data packet in FIG. 4 further includes a high throughput preamble 404 including a high throughput signal field (HT-SIG), a high throughput short training field (HT-STF), and $N_t$ high throughput long training fields (HT-LTF). Following the high throughput preamble 404 is data to be decoded. The $N_t$ HT-LTF fields are used for estimating a channel between multiple transmit and multiple receive antennas, for example. When transmission of the data packet is intended for a MIMO-OFDM receiver, then based on an antenna configuration, the data packet frame format shown in FIG. 4 is transmitted after applying the cyclic shift as described above in Tables 1 and 2 for non-HT and HT portions, respectively.

FIG. 5 illustrates an example frame format of a data packet for a HT only frame format. The frame format of the data packet shown in FIG. 5 may be used in a high throughput network only, for example, such as in the greenfield network mode of IEEE 802.11n where only HT MIMO-OFDM mobile stations operate. The data packet frame format of FIG. 5 includes a high throughput preamble 502 including training fields for MIMO-OFDM systems, for example. The training fields include a high throughput short training field (HT-STF), a high throughput long training field (HT-LTF), a high throughput (HT-SIG) field, and high throughput long training fields (HT-LTFs) in sequence. Following the high throughput preamble 502 is data to be decoded.

The HT-STF field may be the same as the L-STF in the legacy format preamble 402 of the mixed mode data packet frame format, and can be used for timing acquisition, AGC and frequency acquisition, for example. To demodulate content of the HT-SIG, channel estimates can be obtained from the HT-LTF field, for example. For transmit antennas, fields in the data packet frame format are cyclically shifted by using delays described in Table 2, and then transmitted, for example.

In example embodiments, a transmitter transits information without informing a receiver when information or data will begin in the data packet, and the receiver may use patterns sent by transmitter to determine a starting point of the data. In addition, in a wireless network many transmitters and receivers may use and interpret modified preambles, while legacy receivers may not be expecting modified preambles, but might receive signals including such preambles. Thus, due to different transmission modes, a method for determining a starting point of the data or synchronizing data transmission is provided.

A received signal at an $r^{th}$ receive antenna is given as:

$$y_r(n) = \sum_{t=0}^{N_t-1} \sum_{p=0}^{P-1} x_t(n)h_{rt}(n-p)e^{j2\pi\varepsilon n} + v_r(n) \quad \text{Equation (1)}$$

where $h_{rt}(n)$ is an impulse response of a channel between the $r^{th}$ receive antenna and the $t^{th}$ transmit antenna, $x_t(n)$ is a transmit signal at an instant n from the $t^{th}$ transmit antenna, and $v_r(n)$ is additive white Gaussian noise (AWGN) at the $r^{th}$ receive antenna with a variance of $\sigma_v^2$. In addition, p is a length of a multipath channel and remains static across n. The received signal is affected by normalized frequency offset $\epsilon$ caused due to mismatch in oscillators between a transmitter and a receiver.

The received signal includes a preamble and data (e.g., as shown in the data packet frame formats of FIGS. 3-5). In example embodiments, a beginning of the data in the data packet is determined. Example methods described below include determining a rough estimation of a beginning of the data, and determining an exact estimation of the beginning of the data in the data packet.

The data packet includes a preamble comprising a structure or training sequence. The training sequences (STF and LTF) are repetitive patterns of the same sequence transmitted at the beginning of the start of transmission. The repetitive patterns may be defined according to a standard protocol, for example, so that a receiver knows what pattern to search for within a received signal. For example, for the non-HT frame format shown in FIG. 3, the LTF (legacy field) can be detected by old and new mobile stations, and for the HT mixed frame format shown in FIG. 4, a legacy format preamble 402 is included as well so that legacy mobile stations may also detect such a preamble. Using example embodiments provided below, a legacy mobile station may be able to detect and use preambles of formats shown in FIGS. 3-4, for example.

Coarse Timing Offset Estimation Method

After detecting a data packet arrival, automatic gain control (AGC) is triggered and performed (e.g., an average output signal level is fed back to adjust a gain to an appropriate level for a range of input signal levels). An example coarse time offset (CTO) estimator then finds a rough starting position of any of the short symbols (e.g., as shown in FIG. 3 in the STF 302) in the received data packet. An end of the STF can be determined by using the autocorrelation property of the received signal. For example, the STF comprises a pattern (SS) of 16 samples repeated 10 times according to the IEEE 802.11n standard. Each pattern of 16 samples "$N_s$" in the STF is highly correlated with another pattern, and that can be exploited at the receiver. Followed by the STF, an LTF is transmitted. These two training sequences that are transmitted at the start of the communication have been designed to maintain synchronization of the receiver. Other wireless protocols may also transmit other training patterns as well.

To determine a start of one of the patterns in the STF, autocorrelation of the sequence with a lag equal to the periodicity (e.g., $N_s$ in this case) in the STF is used. The receiver will determine correlation values between patterns that are separated by $N_s$ samples, and the correlation values will be high during the STF reception period when compared to the LTF and/or data OFDM symbols reception period. At the end of the STF reception period, the correlation values begin to decrease as the periodic pattern does not hold for subsequent signals. This enables autocorrelation to be used to determine a rough end of the STF. Note that more operations can be performed to determine an exact end of the STF, however, in example embodiments, a coarse (rough) timing offset estimation is sufficient.

The cyclic shift applied to the signal does not affect the autocorrelation because each pattern in a received signal will be the same, only shifted in time. Thus, the autocorrelation principles will apply, for example.

Using the autocorrelation method, only a rough estimate of the start of the STF may be determined because a received signal may be affected due to channel impairments, receiver frontend noise, etc., that can add certain distortion effects and noise. Thus, an exact repetition of the pattern may not be seen at the receiver, however, highly correlated data can be identified and used as a reliable timing point (start or end of sequence), for example.

Let k be the instant at which the AGC is converged and samples are fed through a coarse time offset (CTO) estimator (described below in FIG. 9). A metric S(n) is calculated from the instant k at which the AGC is converged. The metric is given by:

$$S(n) = \frac{1}{N_r} \sum_{r=0}^{N_r-1} \frac{|P_r(n)|}{|R_r(n)|} \quad \text{Equation (2)}$$

where $$P_r(n) = \sum_{d=0}^{N_s-1} y_r(n+d)y_r^*(n+N_s+d) \quad \text{Equation (3)}$$

$$= \sum_{d=0}^{N_s-1} \sum_{t=0}^{N_t-1} \sum_{p=0}^{P-1} |x_t(n+d-p)|^2 |h_{rt}(p)|^2 + \alpha_r(n)$$

and $$R_r(n) = \frac{1}{N_s} \sum_{d=0}^{N_s-1} y_r(n+N_s+d)y_r^*(n+N_s+d) \quad \text{Equation (4)}$$

$$= \frac{1}{N_s} \sum_{d=0}^{N_s-1} \sum_{t=0}^{N_t-1} \sum_{p=0}^{P-1} |x_t(n+d-p)|^2 |h_{rt}(p)|^2 +$$

$$\beta_r(n)$$

Equation (3) defines the autocorrelation of a received signal, and Equation (4) defines a power estimate of a received signal. While calculating the autocorrelation ($P_r(n)$) and the power estimate of the received signal ($R_r(n)$), an impact of channel and frequency offset is nullified because of a sliding window autocorrelation performed on the received signal with a window length of $N_s$ samples. In Equation (3), $\alpha_r(n)$ is a value of the cross correlation between the signal and noise terms. Similarly, in Equation (4), $\beta_r(n)$ is a sum of noise energy and value of cross correlation between the signal and noise terms.

Thus, using Equation (3), an autocorrelation of the signal can be determined and is used in the metric defined in Equation (2). The value of metric S(n) can take different values based on the index n. For example, $$S(n) \leq 1 \; \forall n \leq 8N_s$$

$$S(n) < 1 \; \forall n > 8N_s + K \text{ with } 0 < K < N_s.$$

The parameter $P_r(n)$ can be rewritten as:

$$P_r(n) = \sum_{d=0}^{N_s-K-1} \sum_{t=0}^{N_t-1} \sum_{p=0}^{P-1} |x_t(n+d-p)|^2 |h_{rt}(p)|^2 + \alpha_r(n) \quad \text{Equation (5)}$$

In Equation (5), $\alpha_r(n)$ is a sum of the cross correlation of the signal and noise terms, and cross correlation between samples from the STF and the LTF. Since the fields STF and LTF are highly uncorrelated, the parameter $\alpha_r(n)$ decreases with $n > 8N_s$, which reduces $P_r(n)$. The metric S(n) will form an end of the plateau and could be noisy due to AWGN and multipath fading conditions. To have a smooth plateau, the metric is filtered through a weight filter and is given as:

$$S'(n) = \gamma S'(n-1) + (1-\gamma) S(n) \quad \text{Equation (6)}$$

where $\gamma$ is the weight factor given to previous value and $(1-\gamma)$ is a weight applied to the current metric.

Equation (6) refines the metric by filtering the metric to remove noise. In addition, because of possible multiple channel distortion and noise, the metric might not be smooth. Thus, a smoothing function is also performed by taking a previous sample, and applying a weight with a factor ($\gamma$), and a factor $(1-(\gamma))$ as the weight given to a current sample, for example.

Figure 6:
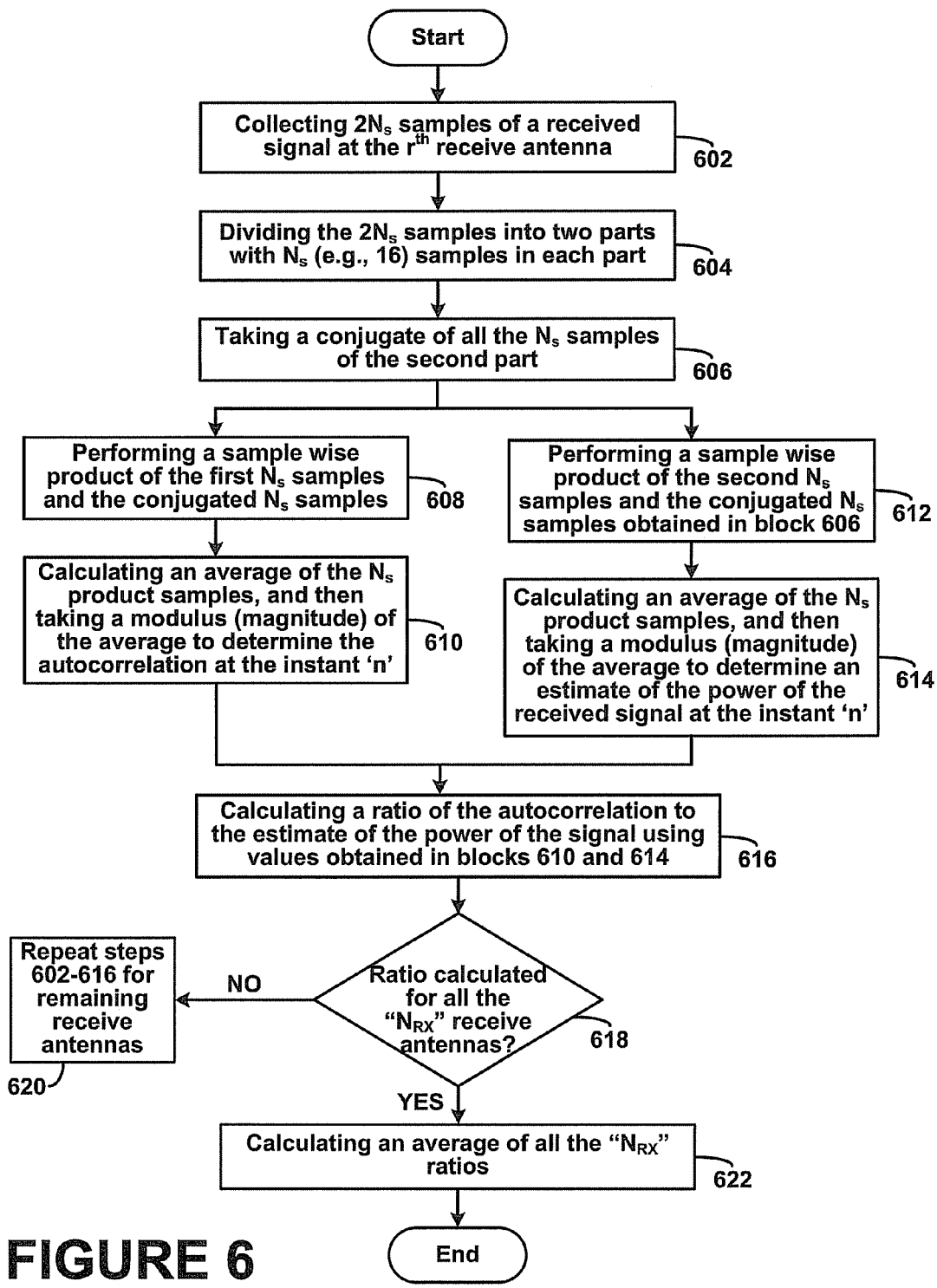
FIG. 6 is a flowchart that depicts example steps of a method for determining a metric used in a coarse timing offset estimation.

FIG. 6 is a flowchart that depicts example steps of a method for determining a metric used in a coarse timing offset estimation for a beginning of data within a data packet. It should be understood that the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

A receiver may have $N_{RX}$ number of receive antennas. The metric S'(n) in Equation (6) can be calculated by first determining a value of $$\frac{|P_r(n)|}{|R_r(n)|}$$

for each of the '$N_{RX}$' receive antennas, and then averaging those "$N_{RX}$" number of $$\frac{|P_r(n)|}{|R_r(n)|}$$

values. To calculate the $$\frac{|P_r(n)|}{|R_r(n)|}$$

value for an $r^{th}$ receive, antenna after the AGC convergence, $2N_s$ (e.g., with $N_s=16$, 32 samples) samples of a received signal are collected at the $r^{th}$ receive antenna, as shown at block 602. The term $N_s$ represents a length of the STF, for example.

Next, the $2N_s$ samples are divided into two parts with $N_s$ (e.g., 16) samples in each part, as shown in block 604. For example, a first part has the first $N_s$ samples among the $2N_s$ samples and the second part has the remaining $N_s$ samples. A conjugate of all the $N_s$ samples of the second part is then taken, as shown at block 606.

Following, a sample wise product of the first $N_s$ samples and the conjugated $N_s$ samples is then obtained, as shown in block 608. Product samples of length $N_s$ will be the result of block 608. Next, an average of the above $N_s$ product samples is calculated, and then a modulus (magnitude) of the average is taken to determine $|P_r(n)|$ at the instant 'n', as shown at block 610.

To determine the power estimate, the sample wise product of the second $N_s$ samples and the conjugated $N_s$ samples obtained in block 606 is calculated, as shown in block 612. Product samples of length $N_s$ will be the result. Next, an average of the $N_s$ product samples is calculated, and then a modulus (magnitude) of the average is taken to determine $|R_r(n)|$ at the instant 'n', as shown at block 614.

The ratio $$\frac{|P_r(n)|}{|R_r(n)|}$$

is calculated using values obtained in blocks 610 and 614, as shown at block 616. This step will give the value $$\frac{|P_r(n)|}{|R_r(n)|}$$

at the $n^{th}$ instant, at the $r^{th}$ receive antenna, by making use of signals received at the $r^{th}$ receive antenna. Thus, the value $$\frac{|P_r(n)|}{|R_r(n)|}$$

can be calculated for all the "$N_{RX}$" receive antennas by making use of receive signals received at respective receive antennas, as shown at blocks 618 and 620.

Following, an average of all the "$N_{RX}$"

$$\frac{|P_r(n)|}{|R_r(n)|}$$

values found for all $N_{RX}$ receive antennas is calculated, as shown at block 620, which will provide the metric value S(n) for the instant 'n'. The metric value S(n) can be found for all the values of 'n' up to $9N_s$ for example. For determining the metric value S(n+1), the 2Ns window is moved by one sample, and the method of the flowchart in FIG. 6 is repeated. Likewise, the metric values S(n+2), S(n+3), S(n+4), ... can be found. Moreover, these values may not be constant at a maximum value (i.e., due to noise) during the STF portion of the reception. To smoothen the metric values, a weight value is applied to the value found in the past while determining a present metric as shown in Equation (6).

After calculating the metric S'(n) of Equation (6), which may be viewed as a normalized ratio of the autocorrelation value in a received signal to an estimate of the power in the received signal, a second metric (D(n)) can be calculated to be compared to the metric S'(n). The metrics can be used to determine an estimate of the CTO.

The second metric, D(n), is an average power of a difference signal over a window of $2N_s$ samples (defined from the instant k). The metric is given as:

$$D(n) = \frac{1}{N_r N_s} \sum_{r=0}^{N_r-1} \sum_{d=0}^{N_s-1} |y_r(n+d) - y_r(n+N_s+d)|^2 \quad \text{Equation (7)}$$

$$\approx 2\sigma_v^2.$$

The value of metric D(n) depends on the instant n. Equation (7) holds true for $n<8N_s$. For $n>8N_s+K$ with $K>0$, the metric will be represented as:

$$D(n) \approx 2\sigma_v^2 + \alpha(n) + \beta(n) \quad \text{Equation (8)}$$

The terms $\alpha(n)$ and $\beta(n)$ represent averaged power of the STF and LTF respectively. As n increases, the total averaged power of the difference signal will increase when compared to the difference signal in Equation (7). This is because the metric D(n) will have contributions from LTF. So, from the instant $n>8N_s$, a gradual increase is seen as K increases. A smoothing operation is performed on the metric by weighted averaging, and the new metric is given as:

$$D'(n) = \lambda D'(n-1) + (1-\lambda) D(n) \quad \text{Equation (9)}$$

where $\lambda$ is a weight factor given to a previous value and $(1-\lambda)$ is a weight factor applied to the current metric.

Thus, generally, to determine the metric D'(n), the stored samples are indexed and samples separated by an index difference of $N_s$ are subtracted. An absolute value of the resultant is then squared to determine a power of the signal, and a sum of the squared values is averaged over a time window and also over the various receiver antennas, for example.

Figure 7:
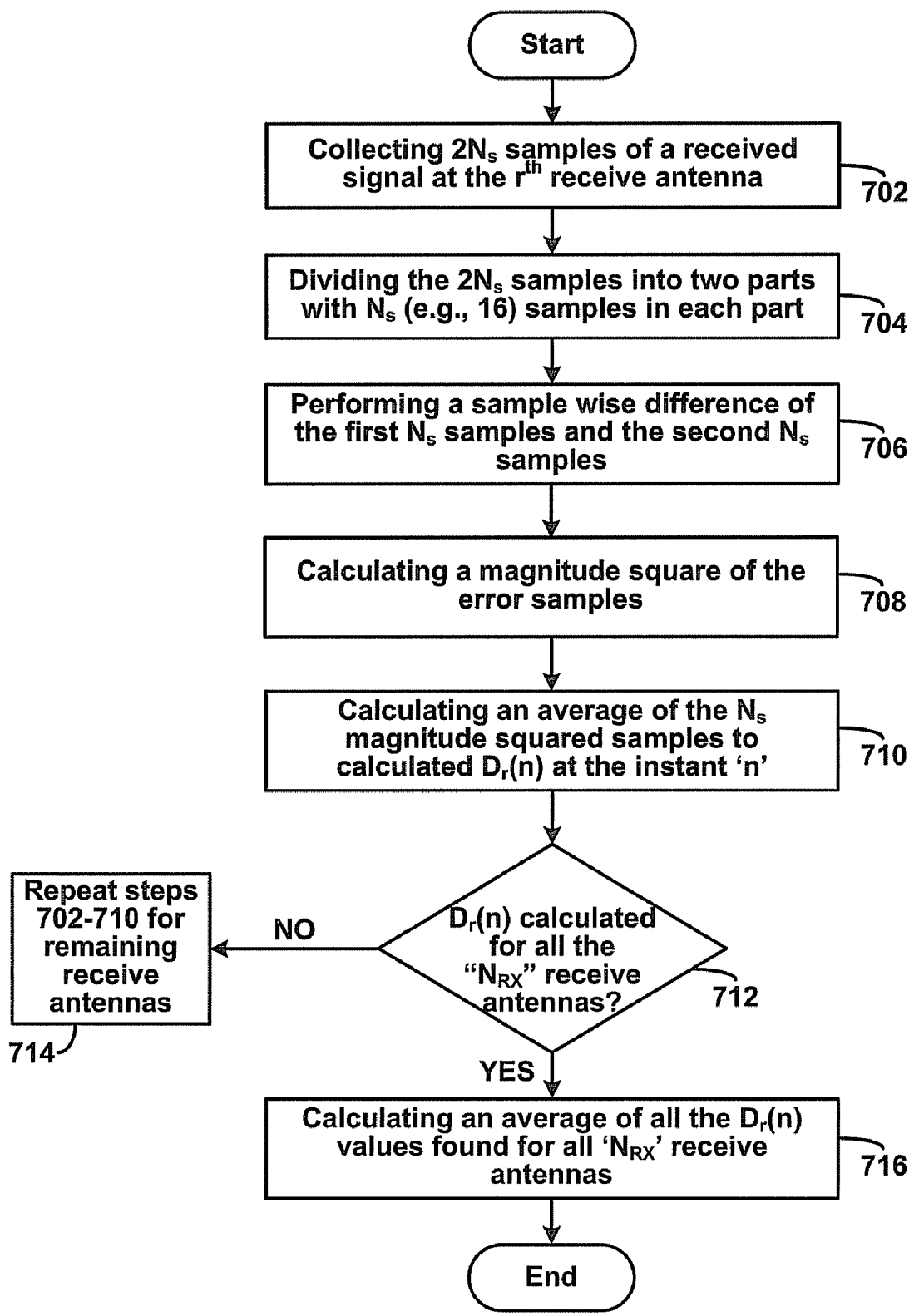
FIG. 7 is a flowchart that depicts example steps of a method for determining another metric used in a coarse timing offset estimation.

FIG. 7 is a flowchart that depicts example steps of a method for determining another metric used in a coarse timing offset estimation for a beginning of data within a data packet. Each block may represent a module, a segment, or a portion of program code, which includes one or more instructions executable by a processor for implementing specific logical functions or steps in the process. In addition, each block may represent circuitry that is wired to perform the specific logical functions in the process.

The method of FIG. 7 can be performed in parallel with the method of FIG. 6 to calculated the metrics D(n) and S(n), simultaneously, for example. At each instant of time, the method of FIG. 7 uses the same $2N_s$ samples used for determining the metric S(n).

To determine the value $D_r(n)$ for the $r^{th}$ receive antenna, after the AGC convergence has completed, $2N_s$ (e.g., 32) samples of a received signal are collected at the $r^{th}$ receive antenna, as shown at block 702. The $2N_s$ samples are divided into two parts with $N_s$ (16) samples in each part, as shown in block 704. For example, a first includes the first $N_s$ samples among the $2N_s$ samples, and the second part includes the remaining $N_s$ samples.

Following, a samplewise difference of the first $N_s$ samples and the second $N_s$ samples is calculated, as shown in block 706. Error samples of length $N_s$ will be the result. Because the channel is assumed to be static, the first samples and the second samples are affected by the channel in the same way, so the only difference is noise.

A magnitude square of the error samples is calculated to calculate a power of the noise in the signal, as shown at block 708. Next, an average of the $N_s$ magnitude squared samples is determined to calculated $D_r(n)$ at the instant 'n', as shown at block 710.

Block 710 provides the value $D_r(n)$ at $n^{th}$ instant, at the $r^{th}$ receive antenna by making use of signals received at $r^{th}$ receive antenna. Similarly, the value $D_r(n)$ can be found for all the '$N_{RX}$' receive antennas by making use of receive signals received at respective receive antennas, as shown at blocks 712 and 714.

An average of all the $D_r(n)$ values found for all '$N_{RX}$' receive antennas is calculated, as shown at block 716, which provide the metric value D(n) for the instant 'n'.

The metric value D(n) can be found for all the values of 'n' up to $9N_s$. For calculating the metric value D(n+1), the 2Ns window is moved by one sample, and the method of FIG. 7 is repeated. Likewise, the metric values D(n+2), D(n+3), D(n+4), ... can be found in a similar manner. To smoothen the metric values, a weight value is applied to a past value as shown in Equation (9).

Figure 8:
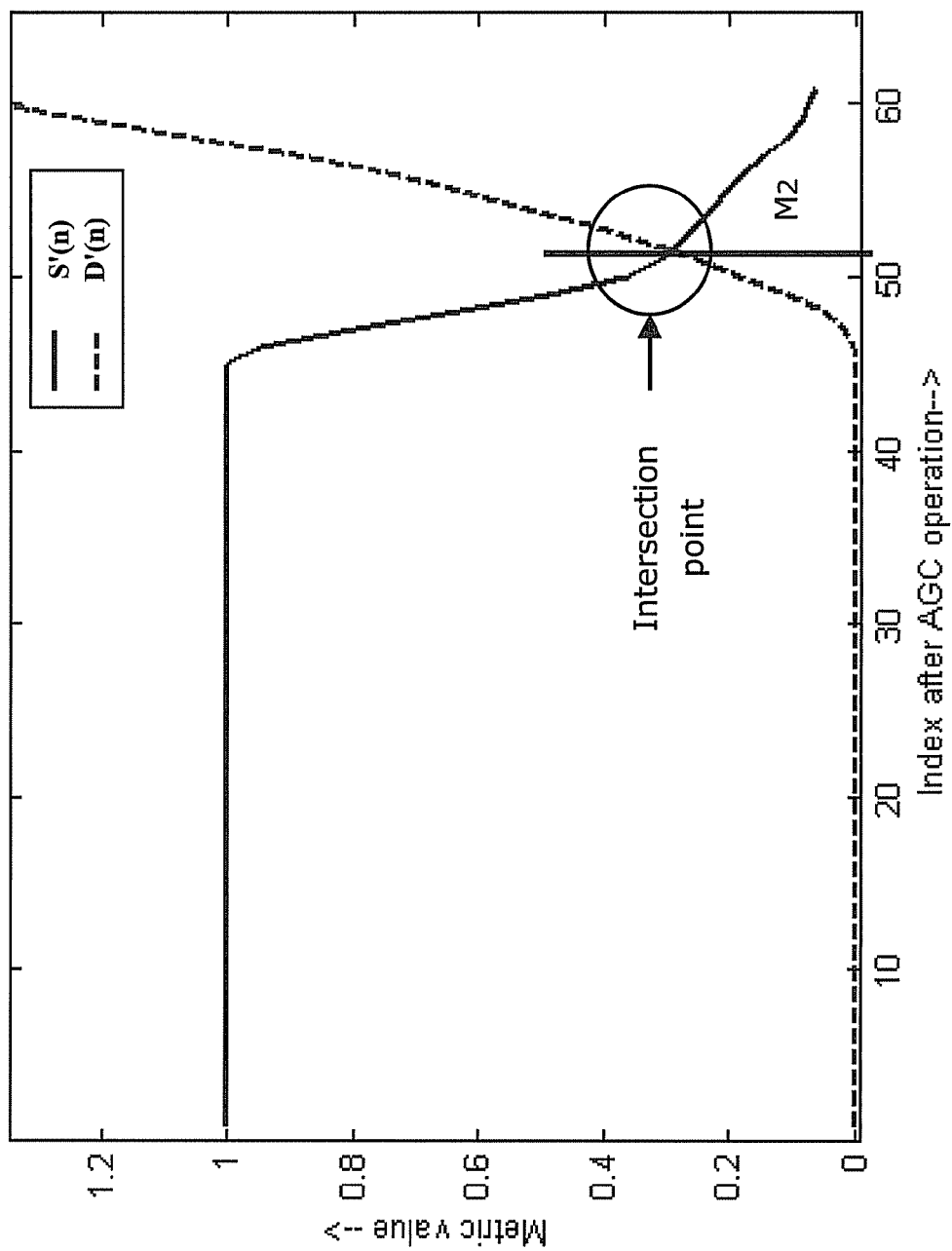
FIG. 8 is an example plot of the metrics determined from FIGS. 7 and 8.

The metrics S'(n) and D'(n) (of Equations (6) and (9)) can be used to determine an estimate of the CTO. FIG. 8 is an example plot of the metrics S'(n) and D'(n) for example values of n. The solid line in the plot of FIG. 8 represents the metric S'(n), and the dashed line in the plot of FIG. 8 represents the metric D'(n).

In FIG. 8, the metric S'(n) is a normalized power, and the metric D'(n) is a noise power. From the combined plot of S'(n) and D'(n), there is steady increase in D'(n) from $8N_s+1$ and there is a steady decrease in the value of S'(n) from $8N_s+1$ because the correlation of the signals decreases over time. The intersection point between the two metrics is estimated as the coarse time.

The intersection will lie within the range $[8N_s+1, 9N_s]$. At a low signal to noise ratio (SNR), both the metrics S'(n) and D'(n) will be noisy and fluctuating, and thus, selecting the intersecting instant may provide a wrong estimate beyond the above mentioned range as there might be more than one intersecting point due to fluctuations. To avoid this issue, a method is used to lock onto a most reliable point. Let $M_2$ be the intersecting point. Then, $M_2$ will be chosen as the CTO estimate when the conditions given below are satisfied:

$$D'(M_2) > D'(n), n = \{M_2 - Q, \ldots, M_2 - 1, M_2\} \quad \text{Equation (10)}$$

$$D'(M_2) < D'(n), n = \{M_2, \ldots, M_2 + Q - 1, M_2 + Q\} \quad \text{Equation (11)}$$

where Q is a number of samples used to make sure that the estimate is not a false alarm due to noise. The objective of the Equations (10)-(11) is that from the intersecting instant $M_2$, there may be continuous Q samples in D'(n) that have a value less than D'($M_2$). Similarly, Equation (11) provides that there may be continuous Q samples in D'(n) that have values greater than D'($M_2$). In ideal channel conditions, the index $M_2$ lies in the middle of the ninth short symbol, for example, since the preamble includes only 10 short symbols and thus the middle of the ninth short symbol provides a coarse estimate for a beginning of data in the data packet. If no noise is present in the signal, intersection occurs at the ninth repetition (e.g., at the ninth short symbol). Thus, intersection will be close to ninth repetition due to noise. Since $M_2$ is an absolute value representing the coarse timing estimate, the offset can be estimated as $M_2 - 8N_s$, for example.

Thus, Equations (10)-(11) above help avoid or to detect a false intersection. To do so, N samples are taken to ensure that the metric S'(n) decreases for a given number of samples. In this manner, a false intersection can be avoided (e.g., metrics might touch at some point prior to a "real" intersection).

Figure 9:
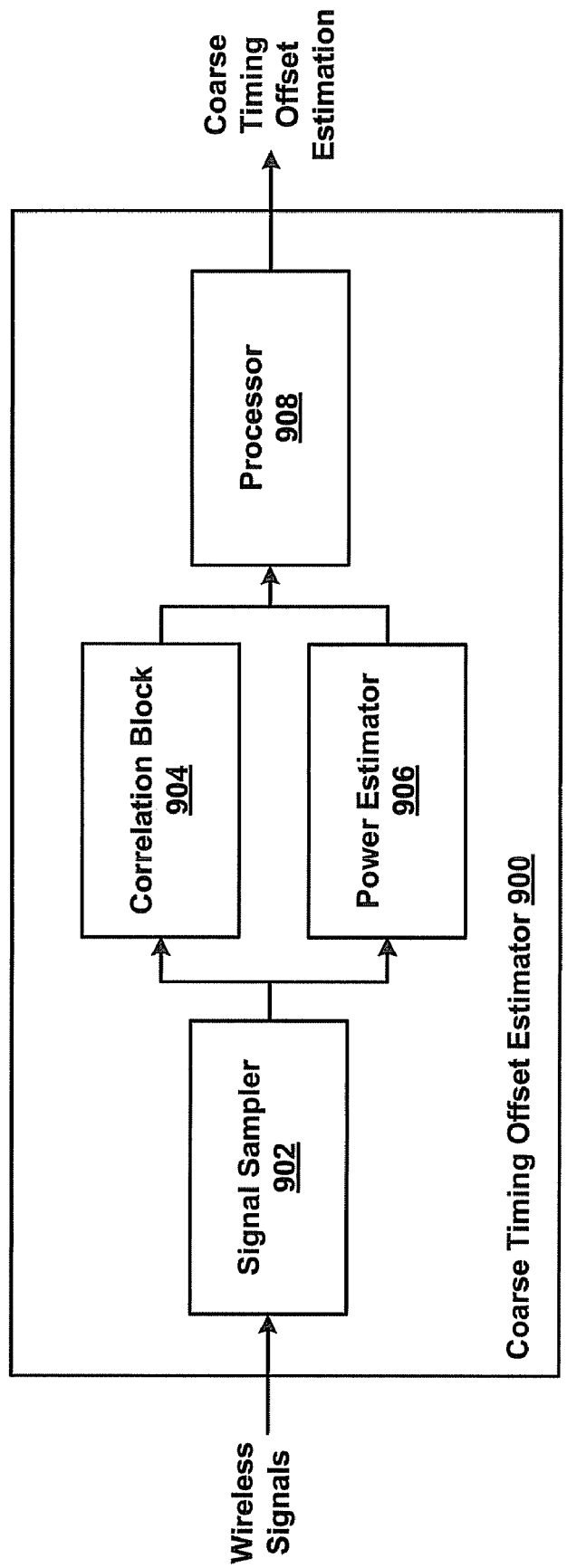
FIG. 9 is a block diagram illustrating an example coarse timing offset estimator.

FIG. 9 is a block diagram illustrating an example coarse timing offset estimator 900. The coarse timing offset estimator 900 receives wireless signals at a signal sampler 902 that samples the signals to produce digital signals, for example. The signal sampler 902 outputs to a correlation block 904 and a power estimator 906. The correlation block 904 correlates patterns of symbol sequences within the wireless signals to produce correlation values. For example, the correlation block 904 performs steps 606-614 in the method of FIG. 6. Generally, the correlation block 904 identifies similarities and differences between the received signals to help identify when the STF ends, for example. The power estimator 906 determines an average of a power of the wireless, and an average of a power of noise in the wireless signals, for example.

The correlation block 904 and the power estimator 906 output to a processor 908. The processor 908 uses the correlation values and the average power values to calculate the metrics S(n) and D(n), for example. The processor 908 further calculates a ratio of the metrics S(n) and D(n), and determines an approximate division of a preamble and data in data packets of the wireless signals based on values of the metrics S(n) and D(n). For example, an intersection of the metrics S(n) and D(n) can be defined as the approximate division of a preamble and data in data packets of the wireless signals. The processor 908 generally may perform the functions of the methods shown in FIGS. 6-7, for example.

Fine Timing Offset Estimation Method

In further example embodiments, additional processing is performed to determine an exact estimate of a beginning of data in a received data packet. A fine timing offset estimator is provided to determine an exact beginning of an OFDM symbol, for example. In multipath channel conditions, it may not be possible to calculate an exact beginning of data because a strongest path could occur at non-zero delays. In example embodiments, an index in a starting of the ninth SS (e.g., where a preamble includes 10 SS) is found where a sum of a channel impulse response energy is maximum between the $r^{th}$ receive antenna and the $t^{th}$ transmit antenna. This can be achieved by using the correlation property of the STF and advantages of the cyclic shift, for example.

Initially, a cross correlation is performed between a received signal and a transmitted signal. Since the CTO estimate lies in the middle of the $9^{th}$ SS, the fine timing offset estimation method is triggered from the index ($M_2$-8) (e.g., (the intersecting point)-8), which will be near a beginning of the short symbols. The received signal at each receive antenna is correlated with all the $N_t$ transmit signals.

Let $\hat{y}_r(n)$ be the received signal at the $r^{th}$ receive antenna, then the cross correlation output between the $r^{th}$ receive antenna and the $t^{th}$ transmit antenna is given as:

$$g_{rt}(n) = \left| \frac{1}{N_s} \sum_{d=0}^{N_s-1} \hat{y}_r(n+d) x_t^*(d) \right| \quad \text{Equation (12)}$$

where n begins from $M_2$ and $g_{rt}(n)$ is calculated for $0 \leq n < N_s$. Since the received signal at each receive antenna contains multiple versions of the transmit signal in a cyclically shifted manner, the cross correlation between the received signal and the transmit signal will result in multiple peaks. Each peak corresponds to a total channel energy between transmit and receive antennas. A position corresponding to a first peak of a first receive antenna output sequence is defined as the fine timing estimate. For example, if the coarse timing estimate $M_2 = 8N_s + 8$ and all the channel impulse responses have the strongest path at zero delay. Then, with reference to the Table 1 above for the 4×4 mixed mode system, the cross correlation output $g_{00}(n)$ between the first transmit antenna signal and the first receive antenna signal will have 4 peaks placed consecutively from $8N_s+1, \ldots, 8N_s+4$. Multiple peaks may correspond to different channel power between transmit and receive antennas. To choose the first peak, with reference to the Table 1 for mixed mode, the metrics $G_{22}(q)$, $G_{33}(q)$ and $G_{44}(q)$ for different antenna configurations are calculated as shown below:

$$G_{22}(q) = \sum_{r=0}^{1} \sum_{m=0}^{4} g_{r0}((q+m))_{N_s} + g_{r1}((12+q+m))_{N_s} \quad \text{Equation (13)}$$

$$G_{33}(q) = \sum_{r=0}^{2} \sum_{m=0}^{4} g_{r0}((q+m))_{N_s} + g_{r1}((14+q+m))_{N_s} + g_{r2}((12+q+m))_{N_s} \quad \text{Equation (14)}$$

$$G_{44}(q) = \sum_{r=0}^{3} \sum_{m=0}^{3} g_{r0}((q+m))_{N_s} + g_{r1}((15+q+m))_{N_s} + g_{r2}((14+q+m))_{N_s} + g_{r3}((13+q+m))_{N_s} \quad \text{Equation (15)}$$

where q=0, 1, ..., 15.

At each receive antenna, there will be $N_t$ correlated outputs with each output having $N_t$ peaks. First, a summation of all the peaks is performed in a correlated output sequence of the first receive antenna from q=0, 1, ..., 15, and this is performed by the running index m. This operation is performed on all the correlated output sequences of that receive antenna, and then all of the summations are combined. The combining is performed such that the peak obtained in all the correlated outputs due to the first transmit antenna signal are added together. To achieve this, a shift is performed on all the correlated outputs except for the first one, and then the outputs are added. The cyclic shifts 50 ns, 100 ns, 150 ns and 200 ns applied at the transmit antenna correspond to a numerical shift of 15, 14, 13 and 12 that is applied at the correlated output obtained from different transmit signals. The above operations are performed on all the receive antennas and then the outputs are added to obtain a final metric.

These metrics represent the summation of the channel power across all transmit and receive antennas. An index corresponding to a maximum of an absolute value of the metric is defined as the fine timing offset. Referring to Table 2, similar metrics can be obtained for different antenna configurations of the green field mode, for example. For an unequal number of transmit and receive antennas, similar metrics can be derived by using numerical shift values.

In an example including a conventional LTF based estimator, the complex cross correlation can be performed between 64 samples in length of long symbols and the received signal. Similar operations across all the receive antennas with all possible transmit signals will increase the complexity of the system. This is because the total complex multiplication performed is $N_t \times N_r \times 64 \times 64$. In example embodiments, the cross correlation is performed between 16 samples in length of short symbols and the received signal. As a result, the complex multiplications required are $N_t \times N_r \times 16 \times 16$.

In example embodiments, the fine timing estimation method uses the STF patterns to perform a cross-correlation using the cyclic shift attributes. For example, in a system including two transmit antennas and two receive antennas, a first antenna transmits a signal and the second transmitter transmits the signal with a cyclic shift, such as shown according to Tables 1-3. Both of the transmit antennas send the same signal, however, the second antenna shifts the signal by a predetermined cyclic shift. At the first receiver antenna, both signals from both the transmitters are received. Starting positions of the signals will be different, however, the combined signal will have both transmitted signals. To perform a correlation of received signals at the receiver antennas, peaks will be found. A first peak will correspond to a position from where the first transmitter transmitted the signal, and a second peak will correspond to a position from where the second transmitter transmitted the signal. The second receive antenna will also identify two peaks. Thus, in all antennas, a cross-correlation can be calculated as shown above in Equation (12). The cross-correlation samples can be collected.

A second correlated signal can be shifted so that all peaks come together, and that position can be chosen as the fine timing offset estimation, for example. As described above, G22 (e.g., 2 cross antennas), G33 (e.g., 3 antennas), G44 (e.g., 4 antennas) are provided. By cross-correlation, multiple peaks at one receive antenna are obtained, and all peaks are combined so that a position at a maximum peak is chosen as fine timing offset estimation point at which to begin sampling data, for example.

Thus, a receiver knows that the STF (e.g., 10 repetitive SS pattern) transmitted by the $t^{th}$ transmit antenna will include an appropriate number left shifts. To determine the FTO estimate, the receiver determines the cross correlation of the received signals with the $N_s$ samples SS transmitted by the $t^{th}$ transmit antenna with appropriate left shifts. The cross correlation of the received signal at the $r^{th}$ receive antenna with the $N_s$ sample SS transmitted by the $t^{th}$ transmit antenna is an amount of energy spread in a channel between the $t^{th}$ transmit antenna and the $r^{th}$ receive antenna during the SS reception duration. The FTO estimate metric, which is a maximum value of energy spread in the channel between all the transmit antennas and all the receive antennas during SS reception duration, can be found by calculating the cross correlation with additional processing. For example, in the absence of channel noise, the cross correlation of the $t^{th}$ transmit antenna of $N_s$ sample SS with the received samples at the $r^{th}$ receive antenna will have $N_{TX}$ number of peaks that are spaced by $(-k)_{NS}=N_s-k$ samples relative to the first peak occurring for the first transmit antenna SS without shift, where k can be any of 1, 2, 3, 4 depending on a number of transmit antenna configuration (e.g., as included in Table 1).

As an example, with two transmit antennas and two receive antennas, peaks will occur at n=0 when $N_s$ samples SS are correlated with no delay (e.g., first antenna transmission), and peaks will occur at n=12 when with $N_s$ samples SS are correlated with 200 ns delay (e.g., 4 sample left shift of the second antenna transmission). This is the case for correlation values in all the receive antennas in an ideal no channel, no noise condition. Accordingly, spacing in a number of samples between peak values of the cross correlation obtained for various transmitted $N_s$ samples SS with respective delays varies depending on the $N_{TX}$ configuration.

A sum of peak values will provide a maximum value of energy spread in the channel across all transmit antennas and the receive antennas. Because the effect of the channel and noise is unknown, 'm' cross correlation values can be taken around a neighborhood of all the peaks spaced by $N_s-k$ samples, and summed at each receive antenna. These values can be summed with the accumulated cross correlation values at all the $N_{RX}$ receive antennas, and at a peak value position and the 'm' neighborhood positions, a maximum value of energy spread in the channel between all the $N_{TX}$ antennas and all the $N_{RX}$ receive antennas is provided, in the presence of the channel.

Figure 10:
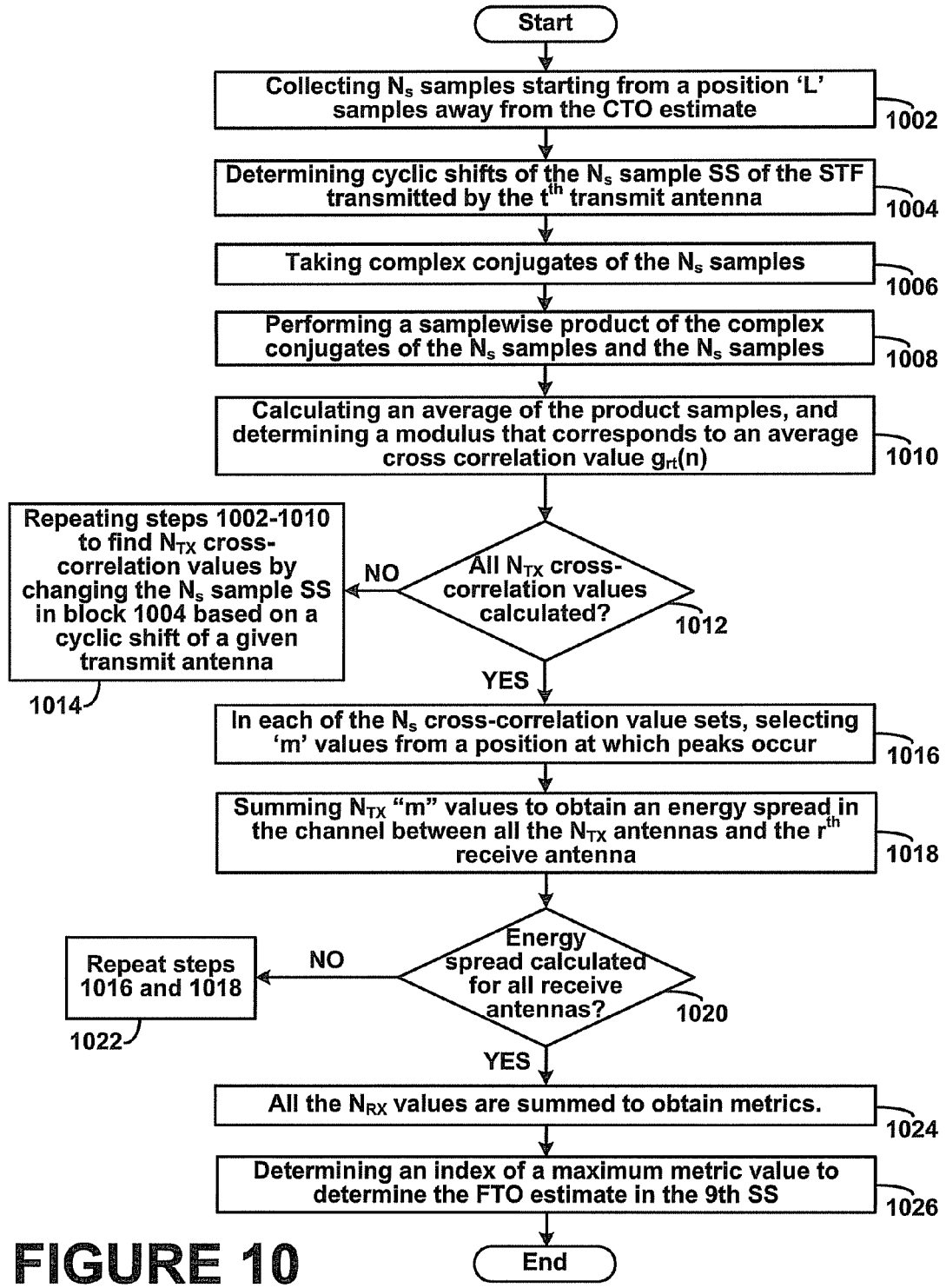
FIG. 10 is a flowchart that depicts example steps of a method for determining a fine timing offset estimation of a beginning of data within a data packet.

FIG. 10 is a flowchart that depicts example steps of a method for determining a fine timing offset estimation for a beginning of data within a data packet. Each block may represent a module, a segment, or a portion of program code, which includes one or more instructions executable by a processor for implementing specific logical functions or steps in the process. In addition, each block may represent circuitry that is wired to perform the specific logical functions in the process.

The method of FIG. 10 assumes an $N_{TX}$ transmit antennas and $N_{RX}$ antenna configuration. The steps are to be performed at each receive antenna. Initially, at an $r^{th}$ receive antenna, $N_s$ samples are collected starting from a position 'L' samples away from the CTO estimate, as shown at block 1002. For example, as described above, since the CTO estimate lies in the middle of the $9^{th}$ SS, the fine timing offset estimation method can be triggered from the index $(M_2-8)$ (e.g., (the intersecting point)−8), which will be near a beginning of the short symbols.

Following, cyclic shifts of the $N_s$ sample SS of the STF transmitted by the $t^{th}$ transmit antenna are determined, as shown at block 1004. Complex conjugates for the $N_s$ samples are taken, as shown at block 1006. A samplewise product of the complex conjugates of the $N_s$ samples and the $N_s$ samples is performed, as shown at block 1008. The result is $N_s$ product samples. An average of the product samples is determined, and a modulus is calculated, as shown at block 1010. The modulus corresponds to an average cross correlation value $g_{rt}(n)$ as shown in Equation 12 at a time instant n.

Steps within blocks 1002-1010 are repeated to find the $N_{TX}$ cross-correlation values $\{g_{r1}(n), g_{r2}(n), \ldots, g_{rNTX}(n)\}$ at time instant n by appropriately changing the $N_s$ sample SS in block 1004 based on a cyclic shift of the transmit antenna in focus, for example, as shown at blocks 1012 and 1014.

The $N_{TX}$ cross-correlation values are found for all the values of n=0, 1, ..., $N_s-1$. Thus, at the $r^{th}$ receive antenna, a total of $(N_s*N_{TX})$ correlation values is found (i.e., $N_{TX}$ sets of $N_s$ cross correlation values at each receive antenna). For n=1, 2, 3, . . . , $N_s-1$, to calculate $N_{TX}$ cross-correlation values at a receive antenna, the input samples at step 1002 are changed by appending one received sample to the previous collected $N_s$ samples and deleting the first sample, for example.

Next, as shown at block 1016, in each of the $N_s$ cross-correlation value sets, 'm' values are taken from a position 'v' at which peaks will occur. Because the effect of the channel and noise is unknown, 'm' cross correlation values can be taken around a neighborhood of all the peaks spaced by $N_s-k$ samples, and summed at each receive antenna. The peak value position varies for different set of $N_s$ cross-correlation values and different TX antenna configurations, for example. Table 4 below describes example positions at which peak values occur based on an index value defining a number of samples, for example. Table 5 describes example values of "m" based on a transmitter/receiver configuration.

TABLE 4

| | | Number of sets = | V - the index at which peak occurs | | | |
|---|---|---|---|---|---|---|
| S. No | $N_{TX}\backslash N_{RX}$ | $N_{TX}$ | Set 1 | Set 2 | Set 3 | Set 4 |
| 1 | 2\2 | 2 | 0 | 12 | — | — |
| 2 | 3\3 | 3 | 0 | 14 | 12 | — |
| 3 | 4\4 | 4 | 0 | 15 | 14 | 13 |

TABLE 5

| S.No | $N_{TX}\backslash N_{RX}$ | 'm' |
|---|---|---|
| 1 | 2\2 | 5 |
| 2 | 3\3 | 5 |
| 3 | 4\4 | 4 |

A number of 'm' correlation values at each set is selected, and a sum of the $N_{TX}$ "m" values is calculated to obtain an energy spread in the channel between all the $N_{TX}$ antennas and the $r^{th}$ receive antenna, as shown at block 1018.

Blocks 1016 and 1018 are repeated for each of the receive antennas (i.e., energy spread in the channel between all the transmit antennas and all the receive antennas is calculated resulting in $N_{RX}$ such values), as shown at blocks 1020 and 1022. All the $N_{RX}$ values are summed to obtain the metrics in Equations 13-15 depending on a TX-RX configuration, for example. To obtain $N_s$ metric values, the 'v' index position is changed to 'v+1', 'v+2', v+Ns-1. An index of a maximum metric value will provide the FTO estimate in the 9th SS, for example, as shown at block 1026.

In the example FTO estimator, an index is found starting in the 9th short symbol (SS) in the short training field (STF) of a data packet where the sum of channel impulse response energy is maximum between the $r^{th}$ receive antenna and the $t^{th}$ transmit antenna. Because there are 10 short symbols (SS) that are repeated, the coarse timing offset is expected to roughly indicate an end of the STF that would correspond to the starting point of the 10th SS. Due to limitations in the CTO estimation method, a rough synchronization somewhere between the 9th and the 10th SS will be performed. And, in the FTO method, the beginning of the 9th SS can be identified, for example.

Figure 11:
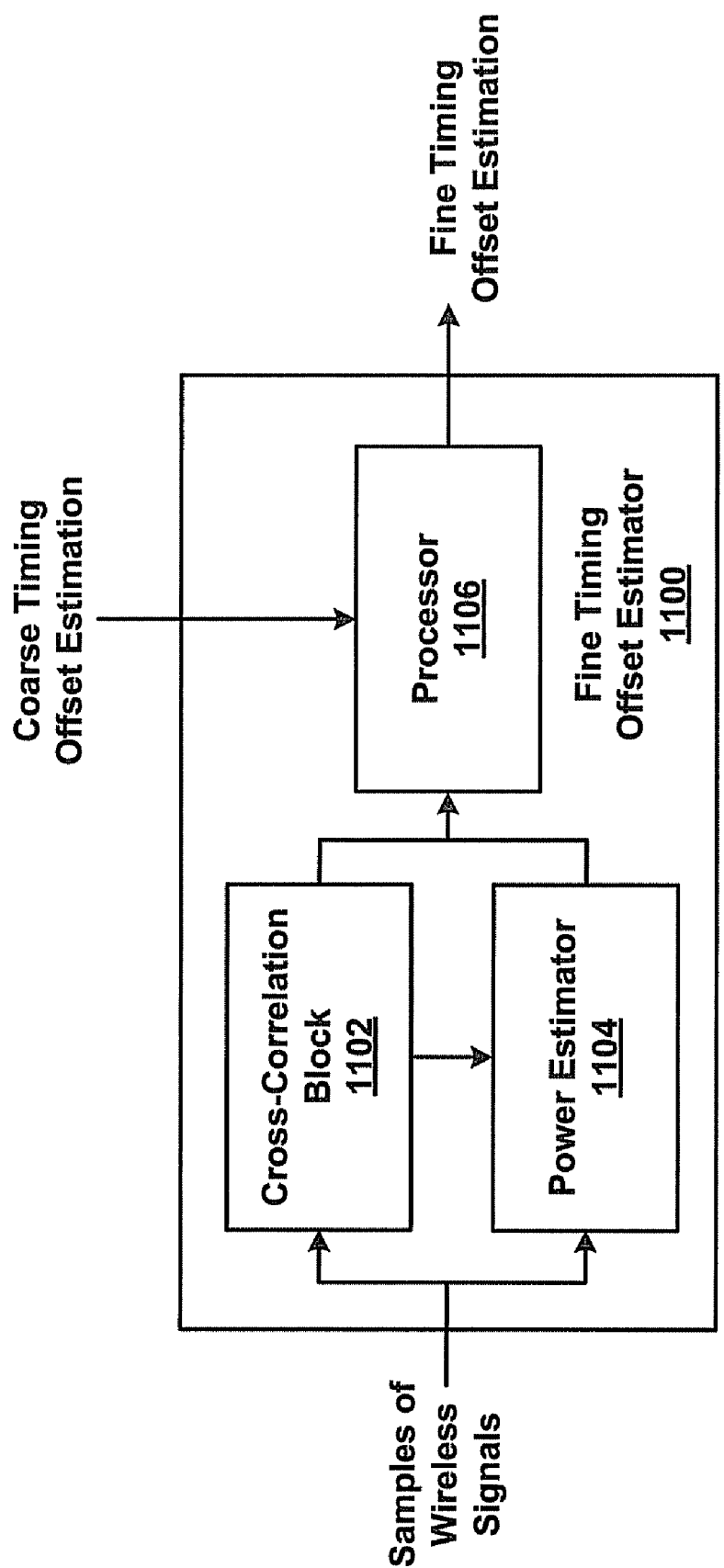
FIG. 11 is a block diagram illustrating an example fine timing offset estimator.

FIG. 11 is a block diagram illustrating an example fine timing offset estimator 1100 that includes a cross-correlation block 1102, a power estimator 1104, and a processor 1106. The cross-correlation block 1102 receives samples of wireless signals. The samples of the wireless signals include multiple versions of a transmitted signal, and each version is a cyclically shifted version of the transmitted signal. The cross-correlation block 1102 determines a cross correlation between the multiple versions of the transmitted signal to produce a number of peaks equal to a number of transmit antennas. Each peak corresponding to a total channel energy between a transmit and a receive antenna.

The power estimator 1104 also receives the samples of the wireless signals and determines a channel impulse response energy between a receive antenna and a transmit antenna. The power estimator 1104 and the cross-correlation block 1102 output to the processor 1106. The processor 1106 determines an index value needed to substantially shift the number of peaks together. The index corresponds to a fine timing offset amount that defines the approximate division of the preamble and the data in the data packet frame format of each signal. Generally, the processor 1106 may perform functions of the method of FIG. 10, for example.

EXAMPLES

Simulations have been performed using preambles for a mixed mode for the multiple antenna case as shown in FIG. 3. MIMO channel models can be used for measuring performance of the system. The channel models characterize indoor radio conditions for the systems that use multiple input and multiple outputs. A normalized frequency offset used for the simulation lies in the range between [−2:2] for a 20 MHz bandwidth.

Figure 12:
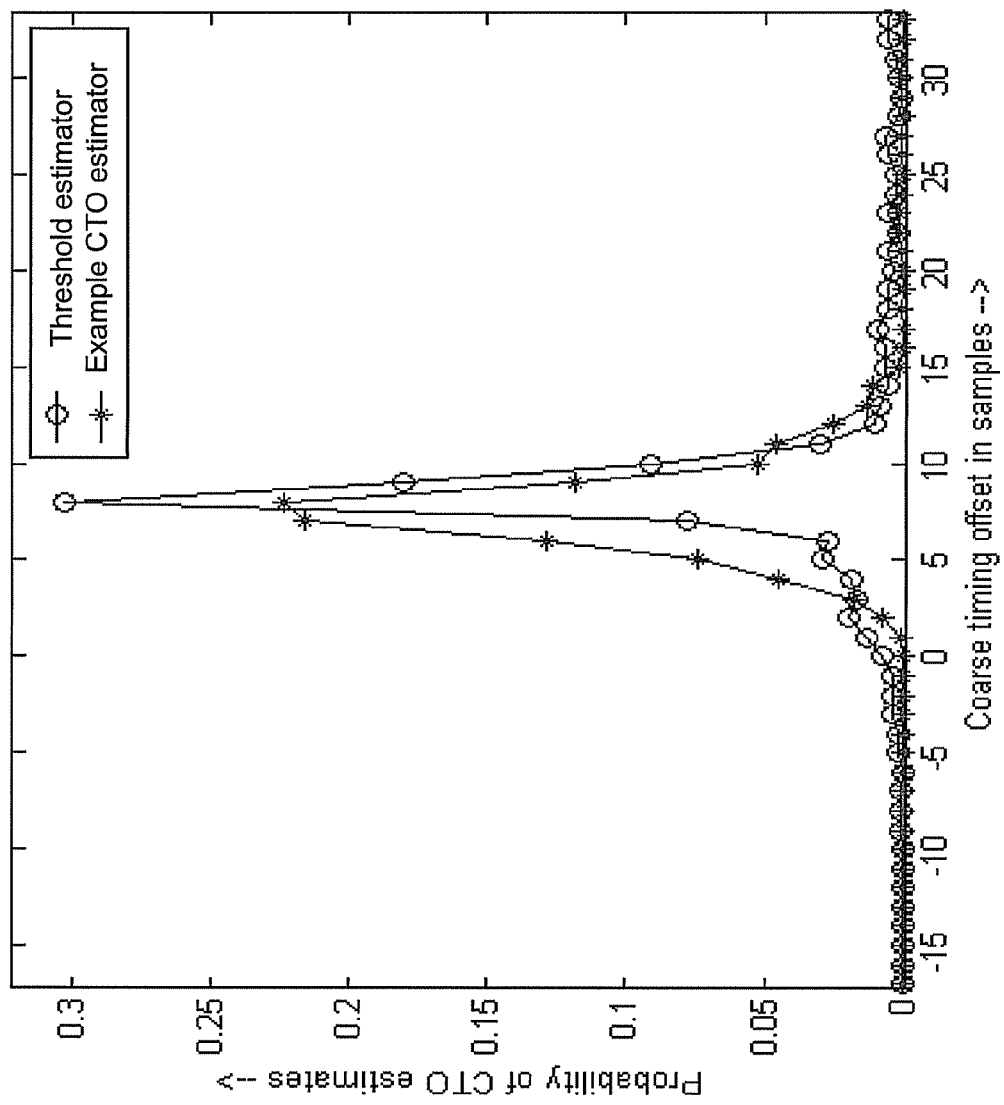
FIGS. 12-15 illustrate example plots of simulations.

A probability of the preamble being identified obtained from an example CTO estimation method as described above of being within the range [0, $N_s-1$] is measured and compared with a probability of a coarse timing offset obtained from a correlation based technique in which the metric S(n) is obtained and a threshold value 0.45 is used to estimate the CTO. The channel model used for this simulation is channel D and AWGN added to obtain an SNR of 8 dB. A weight used in the smoothing operation performed for the metrics S'(n) and D'(n) is 0.5. Results of the simulation are shown in the plot in FIG. 12. The plot indicates that the CTO estimates obtained are well within the range [0, Ns−1]. This may be defined as the estimation accuracy of an example CTO estimator. Though the probability of threshold based CTO is high, there are more numbers of CTO estimates beyond an estimation accuracy [0, Ns−1]. Whereas, the CTO estimates of example proposed techniques is within the estimation accuracy, for example. For example, in FIG. 12, the probability of CTO estimates obtained from a threshold based estimator and from an example proposed estimator are compared. It can be determined which estimator has more number of CTO estimates within an estimation accuracy of [0, Ns−1] [0,15], for example. In FIG. 12, the threshold based CTO estimator has more number of estimates outside the estimation accuracy, whereas the example proposed estimator has almost all the estimates within [0,Ns−1]. Thus, using the short training field for fine timing offset estimation provides desired results.

Figure 13:
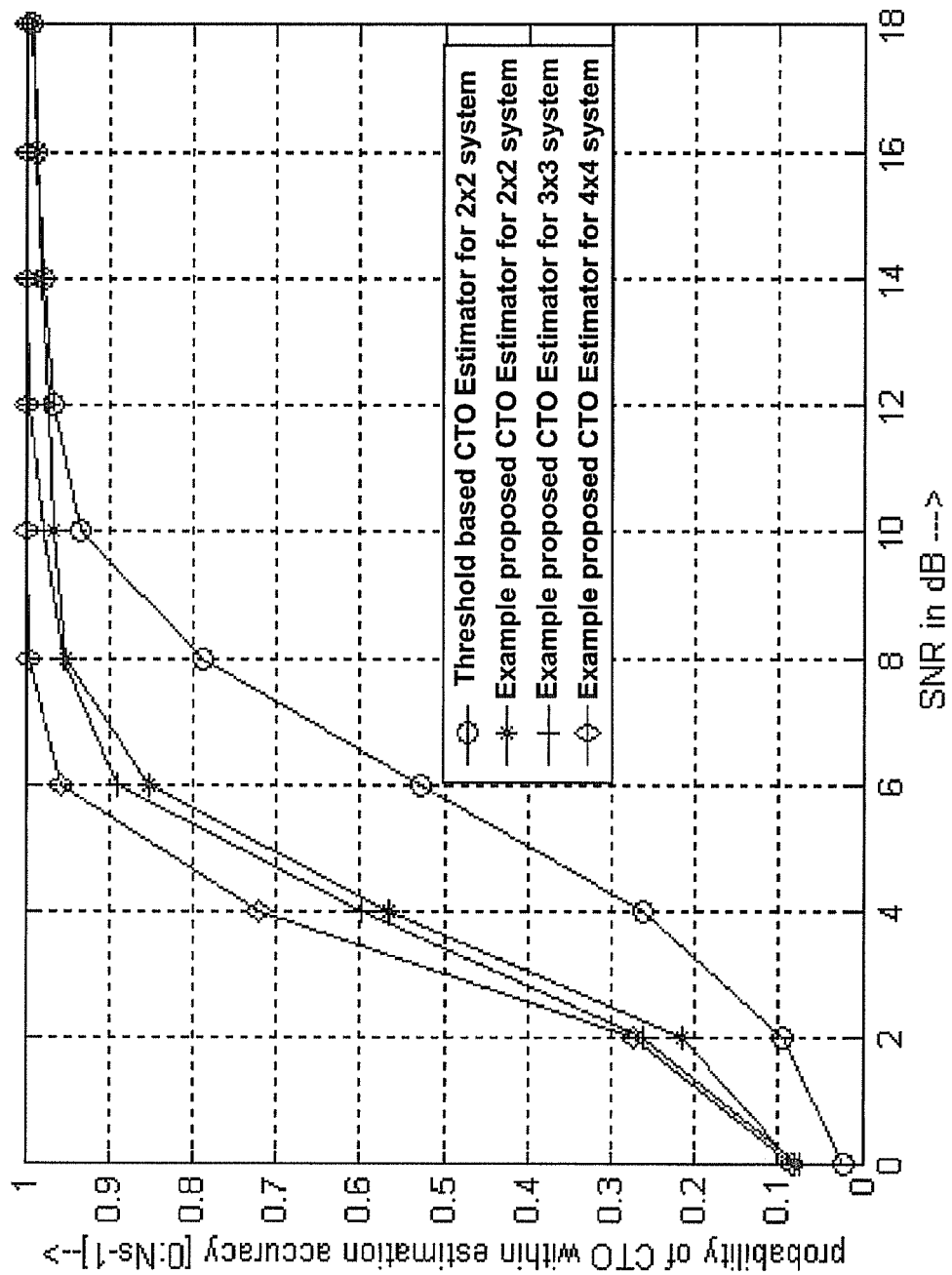

FIG. 13 is another example plot illustrating a probability of CTO estimates within the estimation accuracy obtained from the example proposed method and from the CTO threshold method compared for a 2×2 system. The example CTO performs better at lower SNR values as compared to the threshold CTO estimation method. At lower SNR values, there is may be a high probability of choosing a wrong intersecting point of the metrics. But due to conditions given in Equations (10) and (11), correct intersecting points are selected. For simulation purposes, the parameter Q is assigned to be 8. Similar probability curves are plotted in FIG. 13 for the 3×3 and 4×4 antenna configuration systems using the example CTO estimator. As the number of antennas increase, spatial diversity is leveraged resulting in a better performance for higher antenna configuration, for example.

Figure 14:
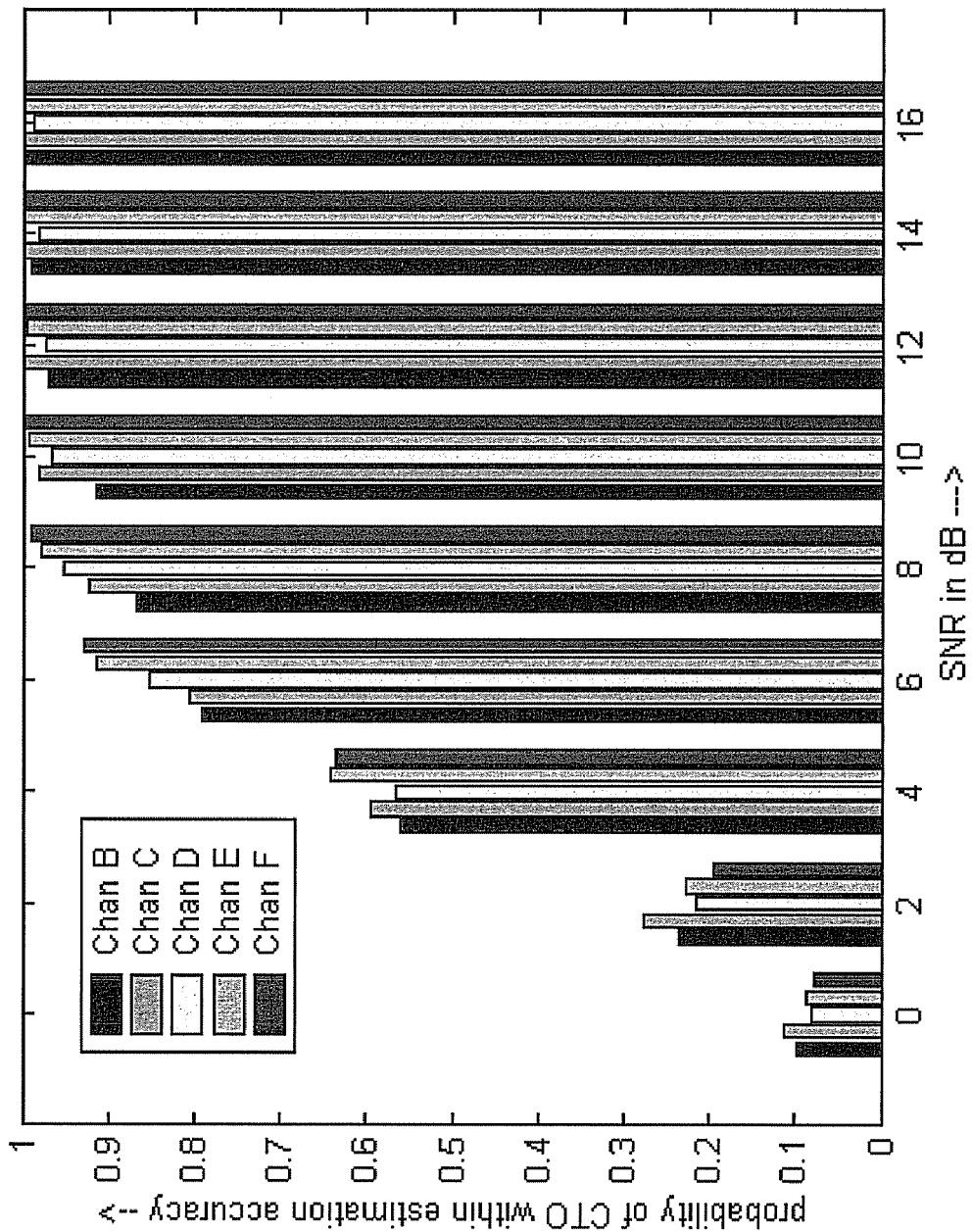

The probability of CTO estimates within $[0, N_s-1]$ obtained from example methods herein for different MIMO channel models is plotted in FIG. 14. A maximum probability is achieved for all channel models at 12 dB SNR, for example.

Figure 15:
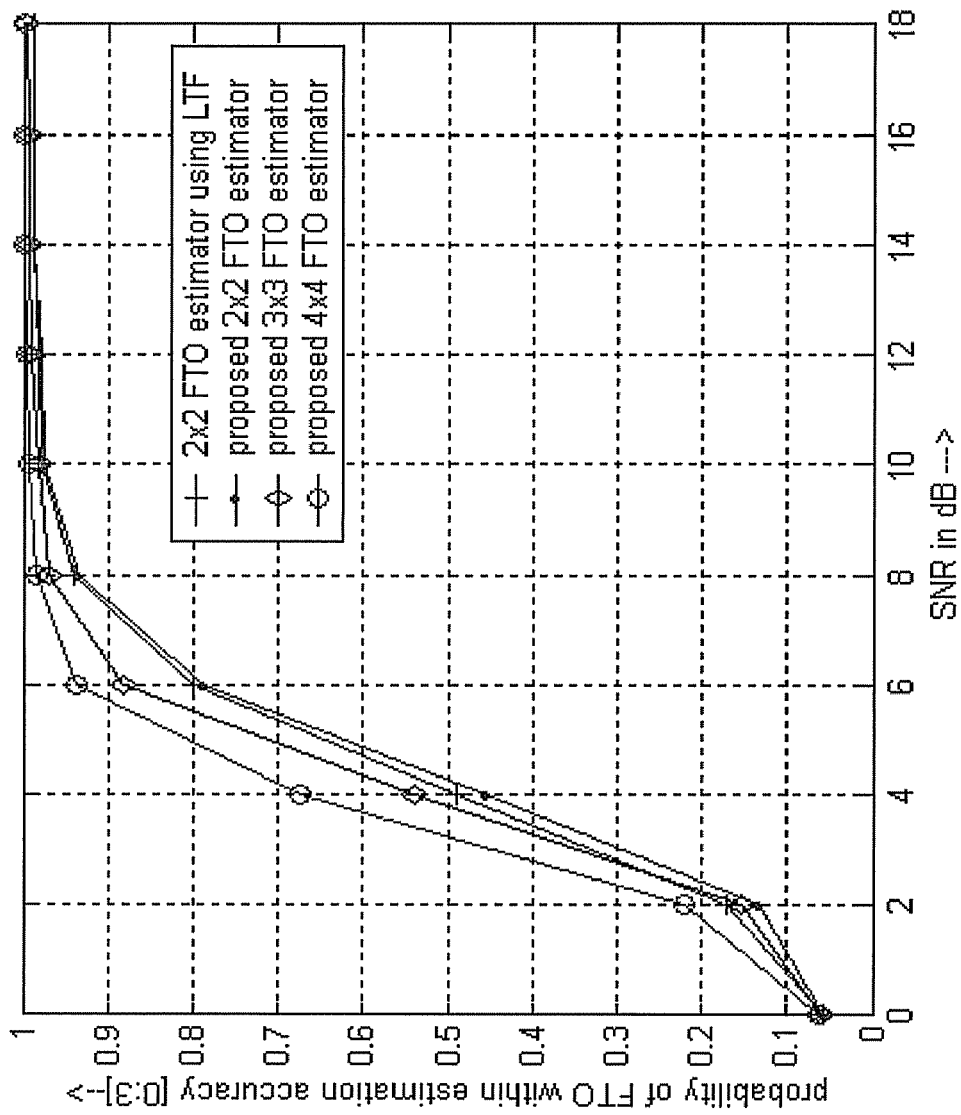

A performance of the example FTO estimator using only the STF is compared with a performance of the FTO estimator using the LTF. In FIG. 15, a probability of the FTO within an estimation accuracy is plotted for a 2×2 system with example methods described herein and with the techniques that use the LTF training sequence. The estimation accuracy is defined with the range [0, 3], for example. A probability of the estimates for example methods described herein is about the same as a probability of the estimates of the computational complex LTF based technique. This follows because the CTO estimates are within an estimation accuracy of $[0, N_s-1]$, and because the cyclic shift is leveraged for detecting a first peak. Same performance is obtained for a 2×2 configuration of the green field mode, for example. In FIG. 15, probabilities of the FTO estimates within the estimation accuracy are plotted for the 3×3 and 4×4 systems of mixed mode. A similar performance for other antenna configurations of the green field mode can also be observed.

Example embodiments described herein refer to over-the-air modulation techniques, such as the IEEE 802.11n standard protocol. However, the example embodiments also apply to other MIMO-OFDM systems or other modulation standards that use a similar preamble structure, for example.

Figure 16:
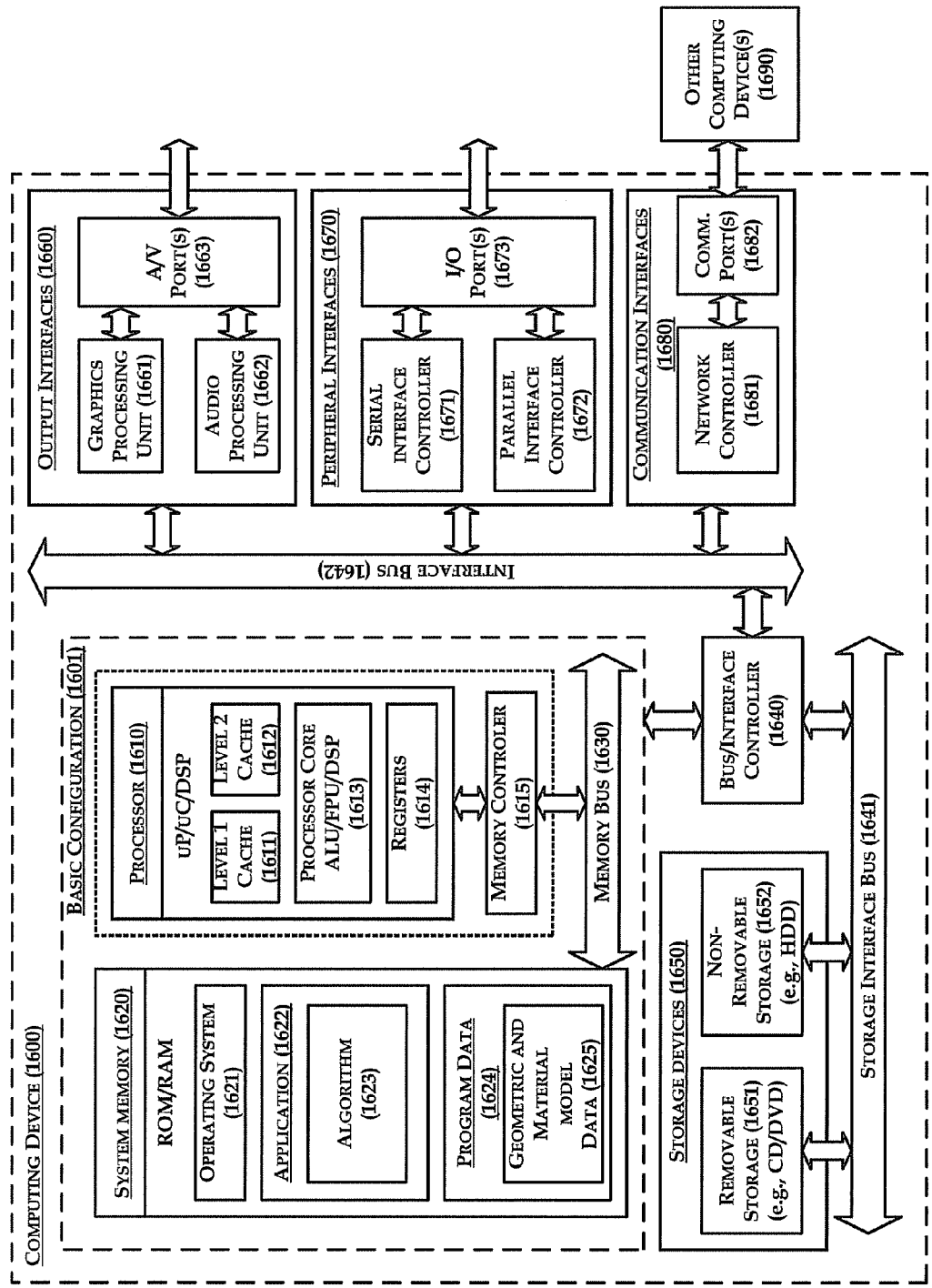
FIG. 16 is a block diagram illustrating an example computing device arranged for computing a coarse timing offset and/or a fine timing offset estimation of a beginning of data in a data packet.

FIG. 16 is a block diagram illustrating an example computing device 1600 arranged for computing a coarse timing offset and/or a fine timing offset estimation of a beginning of data in a data packet, as described herein. In a very basic configuration 1601, computing device 1600 typically includes one or more processors 1610 and system memory 1620. A memory bus 1630 can be used for communicating between the processor 1610 and the system memory 1620.

Depending on the desired configuration, processor 1610 can be of any type including but not limited to a microprocessor (R), a microcontroller (µC), a digital signal processor (DSP), or any combination thereof. Processor 1610 can include one more levels of caching, such as a level one cache 1611 and a level two cache 1612, a processor core 1613, and registers 1614. The processor core 1613 can include an arithmetic logic unit (ALU), a floating point unit (FPU), a digital signal processing core (DSP Core), or any combination thereof. A memory controller 1615 can also be used with the processor 1610, or in some implementations the memory controller 1615 can be an internal part of the processor 1610.

Depending on the desired configuration, the system memory 1620 can be of any type including but not limited to volatile memory (such as RAM), non-volatile memory (such as ROM, flash memory, etc.) or any combination thereof. System memory 1620 typically includes an operating system 1621, one or more applications 1622, and program data 1624. Application 1622 includes geometric and material modeling, and fractal curve selection algorithms 1623 that may be arranged to create the fractal curve representation of the object. Program Data 1624 includes geometric and material model data 1625. In some example embodiments, application 1622 can be arranged to operate with program data 1624 on an operating system 1621. This described basic configuration is illustrated in FIG. 16 by those components within dashed line 1601.

Computing device 1600 can have additional features or functionality, and additional interfaces to facilitate communications between the basic configuration 1601 and any required devices and interfaces. For example, a bus/interface controller 1640 can be used to facilitate communications between the basic configuration 1601 and one or more data storage devices 1650 via a storage interface bus 1641. The data storage devices 1650 can be removable storage devices 1651, non-removable storage devices 1652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1620, removable storage 1651 and non-removable storage 1652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media can be part of device 1600.

Computing device 1600 can also include an interface bus 1642 for facilitating communication from various interface devices (e.g., output interfaces, peripheral interfaces, and communication interfaces) to the basic configuration 1601 via the bus/interface controller 1640. Example output interfaces 1660 include a graphics processing unit 1661 and an audio processing unit 1662, which can be configured to communicate to various external devices such as a display or speakers via one or more A/V ports 1663. Example peripheral interfaces 1660 include a serial interface controller 1671 or a parallel interface controller 1672, which can be configured to communicate with external devices such as input devices (e.g., keyboard, mouse, pen, voice input device, touch input device, etc.) or other peripheral devices (e.g., printer, scanner, etc.) via one or more I/O ports 1673. An example communication interface 1680 includes a network controller 1681, which can be arranged to facilitate communications with one or more other computing devices 1690 over a network communication via one or more communication ports 1682. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1600 can also be implemented as a personal computer including both laptop computer and non-laptop computer configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the teem "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for synchronizing wireless transmission of data packets, the method comprising:
    receiving a plurality of signals, wherein each signal has a data packet frame format including a preamble and data, wherein the preamble comprises a pattern of symbol sequences repeated a number of times;
    correlating patterns of symbol sequences within the plurality of signals to produce correlation values;
    calculating a first metric of the plurality of signals, the first metric being a ratio of an average of the correlation values of the plurality of signals and an average of a power of the plurality of signals;
    calculating a second metric, the second metric defining an average of a power of noise in the plurality of signals; and
    determining an approximate division of the preamble and the data in the data packet frame format of each signal based on values of the first metric and the second metric.

2. The method of claim 1, further comprising filtering the first metric through a weight filter to cause values of the first metric to converge as the correlation values decrease.

3. The method of claim 1, further comprising:
receiving the plurality of signals at a plurality of receive antennas;
calculating the first metric of the plurality of signals for each of the plurality of receive antennas to produce a plurality of first metric values;
averaging the plurality of first metric values;
calculating the second metric of the plurality of signals for each of the plurality of receive antennas to produce a plurality of second metric values; and
averaging the plurality of second metric values.

4. The method of claim 1, wherein $N_s$ samples are included in the pattern of short symbol sequences, and the method further comprises:
collecting $2N_s$ samples of each of the plurality of signal;
dividing the $2N_s$ samples are divided into a first part including a first $N_s$ samples among the $2N_s$ samples and a second part including the remaining $N_s$ samples;
calculating a conjugate of all the $N_s$ samples of the second part;
performing a sample wise product of the first $N_s$ samples of the first part and the conjugated $N_s$ samples to produce $N_s$ product samples;
calculating an average of the $N_s$ product samples; and
calculating a modulus of the average of the $N_s$ product samples to determine the average of the correlation values of the plurality of signals.

5. The method of claim 1, wherein $N_s$ samples are included in the pattern of short symbol sequences, and the method further comprises:
collecting $2N_s$ samples of each of the plurality of signal;
dividing the $2N_s$ samples are divided into a first part including a first $N_s$ samples among the $2N_s$ samples and a second part including the remaining $N_s$ samples;
calculating a conjugate of all the $N_s$ samples of the second part;
performing a sample wise product of the second part including the remaining $N_s$ samples and the conjugated $N_s$ samples to produce $N_s$ product samples;
calculating an average of the $N_s$ product samples; and
calculating a modulus of the average of the $N_s$ product samples to determine the average of the power of the plurality of signals.

6. The method of claim 1, wherein $N_s$ samples are included in the pattern of short symbol sequences, and the method further comprises:
collecting $2N_s$ samples of each of the plurality of signal;
dividing the $2N_s$ samples are divided into a first part including a first $N_s$ samples among the $2N_s$ samples and a second part including the remaining $N_s$ samples;
performing a sample wise difference of the first part including the first $N_s$ samples and the second part including the remaining $N_s$ samples to produce $N_s$ error samples;
calculating a magnitude square of each of the $N_s$ error samples; and
calculating an average of the $N_s$ magnitude squared samples to determine the average of the power of the noise in the signal.

7. The method of claim 1, further comprising determining an intersection point between the first metric and the second metric as the approximate division of the preamble and the data in the data packet frame format of each signal.

8. The method of claim 7, further comprising
determining that the second metric defining the average of the power of noise in the plurality of signals at the intersection point is greater than the second metric defining the average of the power of noise in the plurality of signals at values less than the intersection point;
determining that the second metric defining the average of the power of noise in the plurality of signals at the intersection point is less than the second metric defining the average of the power of noise in the plurality of signals at values greater than the intersection point; and
verifying that the intersection point between the first metric and the second metric is the approximate division of the preamble and the data in the data packet frame format of each signal.

9. The method of claim 1, further comprising determining an index in the preamble where a sum of a channel impulse response energy between a receive antenna and a transmit antenna is maximum.

10. The method of claim 1, wherein each signal of the plurality of signals includes multiple versions of a transmitted signal, wherein each version is a cyclically shifted version of the transmitted signal, and the method further comprises:
determining a cross correlation between the multiple versions of the transmitted signal to produce a number of peaks equal to a number of transmit antennas, each peak corresponding to a total channel energy between a transmit and a receive antenna; and
determining an index value needed to substantially shift the number of peaks together, wherein the index corresponds to a fine timing offset amount that defines the approximate division of the preamble and the data in the data packet frame format of each signal.

11. The method of claim 1, wherein each signal of the plurality of signals includes multiple versions of a transmitted signal, wherein each version is a cyclically shifted version of the transmitted signal, and the method further comprises:
receiving the plurality of signals at a plurality of receive antennas;
at each receive antenna, determining a cross correlation between the multiple versions of the transmitted signal to produce a number of peaks equal to a number of transmit antennas, each peak corresponding to a position to where the transmitted signal was shifted;
at each receive antenna, combining cross correlations of the multiple versions of the transmitted signal by shifting correlated outputs so that peaks substantially match to produce combined cross-correlations;
adding combined cross-correlations from each antenna to produce a third metric; and
identifying a position of a maximum peak within the third metric as a fine timing offset amount that defines the approximate division of the preamble and the data in the data packet frame format of each signal.

12. A computer readable medium having stored therein instructions executable by a computing device to cause the computing device to perform functions of:
receiving a plurality of signals, wherein each signal has a data packet frame format including a preamble and data, wherein the preamble comprises a pattern of symbol sequences repeated a number of times;
correlating patterns of symbol sequences within the plurality of signals to produce correlation values;
calculating a first metric of the plurality of signals, the first metric being a ratio of an average of the correlation values of the plurality of signals and an average of a power of the plurality of signals;

calculating a second metric, the second metric defining an average of a power of noise in the plurality of signals; and determining an approximate division of the preamble and the data in the data packet frame format of each signal based on values of the first metric and the second metric.

13. The computer readable medium of claim 12, wherein the functions further comprise determining an intersection point between the first metric and the second metric as the approximate division of the preamble and the data in the data packet frame format of each signal.

14. The computer readable medium of claim 13, wherein the functions further comprise:

determining that the second metric defining the average of the power of noise in the plurality of signals at the intersection point is greater than the second metric defining the average of the power of noise in the plurality of signals at values less than the intersection point;

determining that the second metric defining the average of the power of noise in the plurality of signals at the intersection point is less than the second metric defining the average of the power of noise in the plurality of signals at values greater than the intersection point; and verifying that the intersection point between the first metric and the second metric is the approximate division of the preamble and the data in the data packet frame format of each signal.

15. The computer readable medium of claim 12, wherein the functions further comprises determining an index in the preamble where a sum of a channel impulse response energy between a receive antenna and a transmit antenna is maximum.

16. The computer readable medium of claim 12, wherein each signal of the plurality of signals includes multiple versions of a transmitted signal, wherein each version is a cyclically shifted version of the transmitted signal, and the functions further comprise:

receiving the plurality of signals at a plurality of receive antennas;

at each receive antenna, determining a cross correlation between the multiple versions of the transmitted signal to produce a number of peaks equal to a number of transmit antennas, each peak corresponding to a position to where the transmitted signal was shifted;

at each receive antenna, combining cross correlations of the multiple versions of the transmitted signal by shifting correlated outputs so that peaks substantially match to produce combined cross-correlations;

adding combined cross-correlations from each antenna to produce a third metric; and identifying a position of a maximum peak within the third metric as a fine timing offset amount that defines the approximate division of the preamble and the data in the data packet frame format of each signal.

17. A system comprising:
a processor;
a data storage medium; and
machine language instructions stored on the data storage medium and executable by the processor to perform the functions of:

receiving a plurality of signals, wherein each signal has a data packet frame format including a preamble and data, wherein the preamble comprises a pattern of symbol sequences repeated a number of times;

correlating patterns of symbol sequences within the plurality of signals to produce correlation values;

calculating a first metric of the plurality of signals, the first metric being a ratio of an average of the correlation values of the plurality of signals and an average of a power of the plurality of signals;

calculating a second metric, the second metric defining an average of a power of noise in the plurality of signals; and determining an approximate division of the preamble and the data in the data packet frame format of each signal based on values of the first metric and the second metric.

18. The system of claim 17, wherein each signal of the plurality of signals includes multiple versions of a transmitted signal, wherein each version is a cyclically shifted version of the transmitted signal, and the functions further comprise:

receiving the plurality of signals at a plurality of receive antennas;

at each receive antenna, determining a cross correlation between the multiple versions of the transmitted signal to produce a number of peaks equal to a number of transmit antennas, each peak corresponding to a position to where the transmitted signal was shifted;

at each receive antenna, combining cross correlations of the multiple versions of the transmitted signal by shifting correlated outputs so that peaks substantially match to produce combined cross-correlations;

adding combined cross-correlations from each antenna to produce a third metric; and identifying a position of a maximum peak within the third metric as a fine timing offset amount that defines the approximate division of the preamble and the data in the data packet frame format of each signal.

19. The system of claim 17, wherein the system is a multiple input multiple output orthogonal frequency division multiplexing (MIMO-OFDM) receiver.

20. The system of claim 17, further comprising a plurality of receive antennas, each of the plurality of receive antennas receiving one of the plurality of signals, and wherein the functions further comprise:

calculating the first metric of the plurality of signals for each of the plurality of receive antennas to produce a plurality of first metric values; and averaging the plurality of first metric values.

* * * * *

UNITED STATES PATENT AND TRADEMARK OFFICE
CERTIFICATE OF CORRECTION

PATENT NO. : 7,920,599 B1  
APPLICATION NO. : 12/726960  
DATED : April 5, 2011  
INVENTOR(S) : Subramanian et al.

Page 1 of 2

It is certified that error appears in the above-identified patent and that said Letters Patent is hereby corrected as shown below:

On the Title Page, Item (56), under "OTHER PUBLICATIONS", in Column 2, Line 9, delete "inthe2.4GHzBand," and insert -- in the 2.4 GHz Band, --, therefor.

On Title Page 2, Item (56), under "OTHER PUBLICATIONS", in Column 1, Line 5, delete "OFMD" and insert -- OFDM --, therefor.

On Title Page 2, Item (56), under "OTHER PUBLICATIONS", in Column 2, Line 1, delete "2004,http:" and insert -- 2004, http: --, therefor.

On Title Page 2, Item (56), under "OTHER PUBLICATIONS", in Column 2, Line 6, delete "requirements-"," and insert -- requirements", --, therefor.

In the Specifications:

In Column 8, Line 7, delete "1.6μS," and insert -- 1.6μs, --, therefor.

In Column 8, Line 9, delete "3.2" and insert -- 3.2μs, --, therefor.

In Column 13, Line 11, delete "2Ns" and insert -- 2$N_s$ --, therefor.

In Column 14, Line 36, delete "2Ns" and insert -- 2$N_s$ --, therefor.

In Column 19, Line 46, delete "v+Ns-1." and insert -- v+$N_s$-1. --, therefor.

In Column 20, Line 39, delete "[0, Ns-1]." and insert -- [0, $N_s$-1]. --, therefor.

In Column 20, Line 43, delete "[0, Ns-1]." and insert -- [0, $N_s$-1]. --, therefor.

Signed and Sealed this  
Eleventh Day of June, 2013

Teresa Stanek Rea  
*Acting Director of the United States Patent and Trademark Office*

CERTIFICATE OF CORRECTION (continued)
U.S. Pat. No. 7,920,599 B1

In Column 20, Line 49, delete "[0, Ns-1]" and insert -- [0, $N_s$-1] --, therefor.

In Column 20, Line 53, delete "[0,Ns-1]." and insert -- [0, $N_s$-1]. --, therefor.

In Column 21, Line 41, delete "(R)," and insert -- ($\mu$P), --, therefor.

In Column 23, Line 39, delete "teem" and insert -- term --, therefor.

In the Claims:

In Column 26, Line 1, in Claim 8, delete "comprising" and insert -- comprising: --, therefor.